United States Patent
Abe

(10) Patent No.: US 7,951,033 B2
(45) Date of Patent: May 31, 2011

(54) POWER UNIT

(75) Inventor: Noriyuki Abe, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 558 days.

(21) Appl. No.: 12/153,954

(22) Filed: May 28, 2008

(65) Prior Publication Data

US 2008/0300082 A1 Dec. 4, 2008

(30) Foreign Application Priority Data

May 29, 2007 (JP) .................. 2007-141630

(51) Int. Cl.
*F16H 3/72* (2006.01)
(52) U.S. Cl. ............... 475/5; 475/53; 475/323
(58) Field of Classification Search ............... 475/5, 53, 475/323, 296, 297, 330
See application file for complete search history.

(56) References Cited

U.S. PATENT DOCUMENTS 7,654,927 B2 * 2/2010 Kimura et al. ............... 475/5
7,794,348 B2 * 9/2010 Tilscher et al. ............. 475/53

FOREIGN PATENT DOCUMENTS

JP 2002-281607 9/2002

* cited by examiner

*Primary Examiner* — David D Le
*Assistant Examiner* — Derek D Knight
(74) *Attorney, Agent, or Firm* — Squire, Sanders & Dempsey (US) LLP

(57) ABSTRACT

A power unit enabling reduction of the size and manufacturing costs thereof and making unnecessary complicated control of power from a prime mover, for changing the speed of power from the prime mover. A first sun gear, a first carrier and a first ring gear of a first planetary gear unit are mechanically connected to drive wheels, the engine, and a pump impeller of a torque converter, respectively. A second sun gear, a second carrier and a second ring gear of a second planetary gear unit are mechanically connected to the engine, the drive wheels, and a turbine runner of the torque converter, respectively. A rotating machine is mechanically connected to one of the first and second ring gears, and the operation of the rotating machine is controlled by a PDU and an ECU. A battery is electrically connected to the rotating machine.

4 Claims, 30 Drawing Sheets

POWER UNIT

BACKGROUND OF THE INVENTION

1. Field of the Invention

The present invention relates to a power unit for driving a driven member, and more particularly to a power unit having a prime mover and rotating machines as power sources.

2. Description of the Related Art

Conventionally, as a power unit of this kind, one disclosed e.g. in Japanese Laid-Open Patent Publication (Kokai) No. 2002-281607 is known. This power unit is for driving drive wheels of a vehicle, and is provided with an internal combustion engine, a first rotating machine, and a second rotating machine, which are power sources, a first planetary gear unit and a second planetary gear unit, and a first control unit and a second control unit, which are for controlling the first and second rotating machines. A carrier of the first planetary gear unit and a sun gear of the second planetary gear unit are connected to each other and are connected to the engine. A ring gear of the first planetary gear unit and a carrier of the second planetary gear unit are connected to each other and are connected to the drive wheels. Further, a sun gear of the first planetary gear unit and a ring gear of the second planetary gear unit are connected to the first and second rotating machines, respectively. Furthermore, the first and second control units are implemented e.g. by inverters.

In the power unit configured as above, the drive wheels are driven using power from the engine and the first and second rotating machines according to traveling conditions of the vehicle. Further, power generation is performed by the first rotating machine using part of power from the engine under the control of the first and second control units, to directly supply the generated electric power to the second rotating machine, and the electric power generated by the first rotating machine, and the rotational speeds of the first and second rotating machines are controlled to thereby transmit power from the engine to the drive wheels while changing the speed of the power from the engine.

As described above, to change the speed of the power from the engine, the conventional power unit is required to incorporate two pairs of the rotating machine and the control unit, which results in an increase in the size of the power unit and an increase in manufacturing costs thereof. Further, to transmit power from the engine to the drive wheels while changing the speed of the power from the engine, it is necessary to control the electric power generated by the first rotating machine and the rotational speeds of the first and second rotating machines in a fine-grained manner, which causes an increase in computation load on the first and second control units.

SUMMARY OF THE INVENTION

It is an object of the present invention to provide a power unit which makes it possible to achieve reduction of the size and manufacturing costs thereof, and dispenses with complicated control of power from a prime mover, for changing the speed of power from the prime mover.

To attain the above object, the present invention provides a power unit for driving a driven member, comprising a prime mover, a fluid coupling that includes an input member and an output member, the fluid coupling being configured to be capable of transmitting power between the input member and the output member via working fluid, a first power transmission mechanism that includes first, second and third elements, and has a function of distributing power input to the second element to the first element and the third element, and a function of combining power input to the first element and power input to the third element, and then outputting combined power to the second element, the first to third elements being configured such that respective rotational speeds of the first to third elements satisfy a collinear relationship and are aligned in order in a collinear chart representing the collinear relationship, the first element being mechanically connected to the driven member, the second element being mechanically connected to the prime mover, and the third element being mechanically connected to the input member, a second power transmission mechanism that includes fourth, fifth and sixth elements, and has a function of distributing power input to the fifth element to the fourth element and the sixth element, and a function of combining power input to the fourth element and power input to the sixth element and then outputting combined power to the fifth element, the fourth to sixth elements being configured such that respective rotational speeds of the fourth to sixth elements satisfy a collinear relationship and are aligned in order in a collinear chart representing the collinear relationship, the fourth element being mechanically connected to the prime mover, the fifth element being mechanically connected to the driven member, and the sixth element being mechanically connected to the output member, a rotating machine mechanically connected to one of the third element and the sixth element, a control unit for controlling an operation of the rotating machine, and an electric power storage device electrically connected to the rotating machine.

With the arrangement of the power unit according to the present invention, the second element of the first power transmission mechanism and the fourth element of the second power transmission mechanism are mechanically connected to the prime mover, while the first element of the first power transmission mechanism and the fifth element of the second power transmission mechanism are mechanically connected to the driven member. Further, the input member and the output member of the fluid coupling are mechanically connected to the third element of the first power transmission mechanism and the sixth element of the second power transmission mechanism, respectively. Furthermore, the rotating machine is mechanically connected to one of the third element and the sixth element, and the electric power storage device is electrically connected to the rotating machine. Further, the operation of the rotating machine is controlled by the control unit. Hereinafter, a case where the rotating machine is connected to the third element is referred to as "the first connection pattern", and a case where the rotating machine is connected to the sixth element is referred to as "the second connection pattern".

In the power unit constructed as above, power from the prime mover is transmitted to the driven member, e.g. as follows: As shown in FIG. 32, part of the power from the prime mover is transmitted to the second element, and the remainder thereof is transmitted to the fourth element. The power transmitted from the prime mover to the second element is distributed to the first element and the third element. The power distributed to the first element is transmitted to the driven member, and the power distributed to the third element is transmitted to the sixth element via the fluid coupling. Further, the power transmitted to the sixth element and the power transmitted to the fourth element as described above are combined, and then the combined power is transmitted to the driven member via the fifth element. It should be noted that in FIG. 32, thick solid lines with arrows indicate flows of the power.

Further, FIG. 33A shows a collinear chart illustrating the relationship between the respective rotational speeds of the first to third elements, together with a collinear chart illustrating the relationship between the respective rotational speeds of the fourth to sixth elements. Based on the above-described connecting relationships, the relationship between the rotational speeds of the first to sixth elements, and the rotational speeds of the prime mover, the driven member, the input member and the output member can be represented in one collinear chart as shown in FIG. 33B.

The fluid coupling is capable of transmitting power between the input member and the output member in a state allowing the rotational difference between the members. Therefore, according to the present invention, when the rotational speed of the output member is lower than that of the input member as shown in FIG. 33B, and the rotational speed of the driven member is lower than that of the prime mover, it is possible to transmit the power from the prime mover to the driven member while steplessly reducing the speed from the prime mover. Further, it is possible to carry out the above-described reduction of the speed of the power from the prime mover without controlling the fluid coupling at all. This makes it completely unnecessary to perform such complicated control of the rotating machine as in the conventional power unit described above. Furthermore, according to the present invention, the fluid coupling a pair of the rotating machines, and the control unit are used in place of two pairs of the rotating machines and the control unit conventionally used. In general, the fluid coupling is smaller in size and more inexpensive than a combination of a pair of rotating machines and a control unit comprised of an electric circuit. This makes it possible to reduce the size and manufacturing costs of the power unit.

Further, as described above, the rotating machine is connected to the third element or the sixth element, and hence e.g. when the driven member is being driven using the power from the prime mover, power from the rotating machine is transmitted, together with the power from the prime mover, to the driven member via the third element, the fluid coupling, the sixth element and the fifth element in the case of the above-mentioned first connection pattern (the rotating machine being connected to the third element), and via the sixth element and the fifth element in the case of the above-mentioned second connection pattern (the rotating machine being connected to the sixth element). As described above, in both of the patterns, the power from the prime mover can be assisted by the rotating machine. Furthermore, for the same reason, e.g. when the driven member is being driven using the power from the prime mover, power generation can be performed by the rotating machine by using the power transmitted from the prime mover to the third element in the case of the first connection pattern, and by using the power transmitted from the prime mover to the sixth element in the case of the second connection pattern, and the electric power storage device can be charged with the generated electric power. Hereinafter, the aforementioned assistance and charging by the rotating machine are referred to as "rotating machine assistance" and "drive-time charging", respectively.

Therefore, e.g. when a heat engine is used as a prime mover, if excellent fuel economy of the prime mover cannot be obtained due to a high or low load on the driven member, it is possible to obtain the excellent fuel economy while properly driving the driven member, in both of the first and second connection patterns, by controlling the power from the prime mover such that the excellent fuel economy can be obtained, compensating for shortage of the power from the prime mover with respect to the load on the driven member by rotating machine assistance, and performing drive-time charging using surplus power from the prime mover.

Further, during rotating machine assistance and drive-time charging, and in both of the first and second connection patterns, by controlling the torque and rotational speed of the rotating machine, and electric power generated by the rotating machine for charging the electric power storage device, it is possible to steplessly control the rotational speed of the driven member. More specifically, in the case of the first connection pattern, as shown in FIG. 34, when the rotational speed of the driven member is lower than that of the prime mover, drive-time charging is performed to reduce torque used for charging to thereby increase the rotational speed of the rotating machine to a rotational speed higher than that of the prime mover. Thus, it is possible to steplessly lower the ratio of the rotational speed of the driven member to that of the prime mover. Inversely, if rotating machine assistance is performed to increase the torque of the rotating machine and lower the rotational speed of the rotating machine, it is possible to steplessly increase the ratio of rotation of the driven member to that of the prime mover. In this case, by increasing the torque of the rotating machine, and as shown in FIG. 35, reducing the rotational speed of the rotating machine to a rotational speed lower than that of the prime mover, it is possible to steplessly increase the rotational speed of the driven member to a rotational speed higher than that of the prime mover.

Further, in the case of the second connection pattern, as shown in FIG. 36, when the rotational speed of the driven member is lower than that of the prime mover, drive-time charging is performed to increase charging electric power to thereby reduce the rotational speed of the rotating machine to a rotational speed lower than that of the prime mover. This makes it possible to steplessly reduce the rotational speed of the driven member. Inversely, by performing rotating machine assistance to increase the torque of the rotating machine and increase the rotational speed of the rotating machine, it is possible to steplessly increase the rotational speed of the driven member. In this case, in addition to increasing the torque of the rotating machine, increasing the rotational speed of the rotating machine to a rotational speed higher than that of the prime mover, as shown in FIG. 37, it is possible to steplessly increase the rotational speed of the driven member to a rotational speed higher than that of the prime mover.

On the other hand, since the fluid coupling transmits power via the working fluid, transmission efficiency is lower than when power is transmitted using gears, for example. According to the present invention, as described above with reference to FIG. 32, power is distributed and combined by the first and second power transmission mechanisms, whereby compared with the case where the prime mover is directly connected to the fluid coupling, it is possible to reduce the power from prime mover to be transmitted through the fluid coupling. Therefore, compared with the case where the fluid coupling is directly connected to the prime mover, the transmission loss of the power from the prime mover in the fluid coupling can be reduced, whereby it is possible to enhance the efficiency of driving the driven member using the prime mover.

Further, as described above, in the case of the second connection pattern, the power from the rotating machine is transmitted to the driven member without via the fluid coupling during rotating machine assistance. Thus, in the case of the second connection pattern, since the power transmitted through the fluid coupling is reduced during rotating machine assistance, the transmission loss of the power in the fluid coupling can be reduced, whereby it is possible to enhance the efficiency of driving the driven member using the prime mover and the rotating machine. Further, for the same reason, it is possible to reduce the size of the fluid coupling, thereby making it possible to further reduce the size the power unit.

Furthermore, in the case of the first connection pattern, as is clear from FIG. 32, during drive-time charging, the power from the prime mover is transmitted to the rotating machine without via the fluid coupling. This makes it possible to avoid the power transmission loss in the fluid coupling, and enhance the power generation efficiency of the rotating machine in the case of using the power from the prime mover.

Further, since the rotating machine is connected to the third or sixth element, e.g. during decelerating operation of the driven member, power from the driven member is transmitted to the rotating machine via the fifth element, the sixth element, the fluid coupling and the third element in the case of the first connection pattern, and via the fifth and sixth elements in the case of the second connection pattern. Therefore, in both cases of the first and second connection patterns, it is possible to perform power generation by the rotating machine using the power from the driven member, and charge the electric power storage device with the generated electric power. Particularly in the case of the second connection pattern, the power from the driven member is transmitted to the rotating machine without via the fluid coupling as described above, and hence it is possible to avoid the power transmission loss in the fluid coupling. This makes it possible to enhance power generation efficiency of the rotating machine in the case of using the power from the prime mover.

Preferably, the first power transmission mechanism is a first planetary gear unit that has a first sun gear, a first ring gear, and a first carrier rotatably supporting first planetary gears in mesh with the first sun gear and the first ring gear, the first element being one of the first sun gear and the first ring gear, the second element being the first carrier, and the third element being the other of the first sun gear and the first ring gear, and the second power transmission mechanism is a second planetary gear unit that has a second sun gear, a second ring gear, and a second carrier rotatably supporting second planetary gears in mesh with the second sun gear and the second ring gear, the fourth element being one of the second sun gear and the second ring gear, the fifth element being the second carrier, and the sixth element being the other of the second sun gear and the second ring gear.

With the arrangement of this preferred embodiment, since the first and second power transmission mechanisms are formed by the first and second planetary gear units of a general type, it is possible to construct the power unit easily and inexpensively without using a special mechanism. Further, the planetary gear unit has a characteristic that a torque-transmitting capacity thereof is relatively large with respect to a size thereof. Therefore, according to the present invention, it is possible to achieve further reduction of the size of the power unit.

More preferably, the first element is the first sun gear, the third element being the first ring gear, the fourth element being the second sun gear, and the sixth element being the second ring gear.

With the arrangement of this preferred embodiment, the fluid coupling is connected to the first and second ring gears that are arranged in outer peripheries of the first and second planetary gear units, respectively. Therefore, it is possible to facilitation connection of the fluid coupling and in turn assembly of the power unit.

Preferably, the power unit further comprises a clutch that is configured such that a degree of engagement of the clutch is controllable, and is provided for engagement and disengagement between the input member and the output member.

With the arrangement of this preferred embodiment, the clutch configured such that the degree of engagement thereof is controllable connects and disconnects between the input member and the output member of the fluid coupling. Therefore, by controlling the degree of engagement of the clutch, it is possible to control the rotational difference between the input member and the output member such that the difference is reduced, which makes it possible to control the degree of reduction of the speed of the prime mover, described above with reference to FIG. 33. Further, in this case, since only the degree of engagement of the clutch is controlled, the control of the degree of reduction of the speed of the power transmitted from the prime mover to the driven member is made much simpler than the prior art which controls electric power generated by one rotating machine and rotational speeds of two rotating machines.

The above and other objects, features, and advantages of the present invention will become more apparent from the following detailed description taken in conjunction with the accompanying drawings.

DETAILED DESCRIPTION OF PREFERRED EMBODIMENTS

Figure 1:
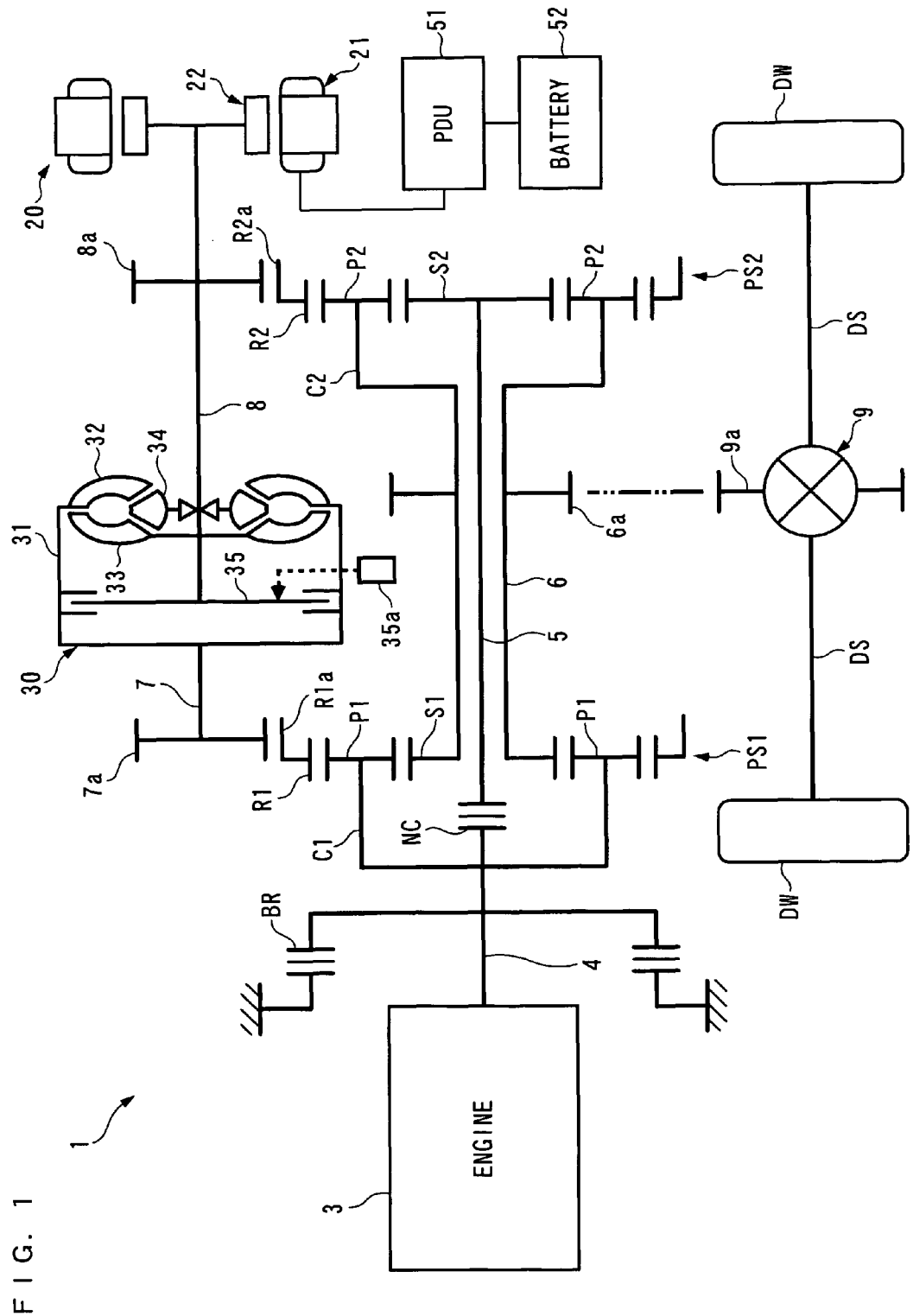
FIG. 1 is a schematic diagram of a drive system for a vehicle, to which is applied a power unit according to a first embodiment of the present invention.

The invention will now be described in detail with reference to the drawings showing preferred embodiments thereof. FIG. 1 schematically shows a drive system for a vehicle, not shown, to which is applied a power unit according to a first embodiment of the present invention. The power unit 1 is for driving left and right drive wheels DW and DW (driven member) of the vehicle, and is comprised of an internal combustion engine 3 (prime mover) and a rotating machine 20, which are power sources, and a first planetary gear unit PS1 (first power transmission mechanism), a second planetary gear unit PS2 (second power transmission mechanism), a torque converter 30 (fluid coupling), a differential gear mechanism 9, and left and right drive shafts DS and DS, for transmitting power to the drive wheels DW and DW. The internal combustion engine (hereinafter simply referred to as "the engine") 3 is an gasoline engine, for example. The differential gear mechanism 9 is connected to the drive-wheels DW and DW via the drive shafts DS and DS.

The rotating machine 20 is e.g. a three-phase brushless DC motor, and is comprised of a stator 21 formed e.g. by a plurality of iron cores and coils and a rotor 22 formed e.g. by a plurality of magnets. The stator 21 is fixed to an immovable casing, not shown, and is electrically connected to a battery 52 (power storage device) and an ECU 2 (control unit), described hereinafter, via a power drive unit (hereinafter referred to as "the PDU") 51 (see FIG. 2). The PDU 51 is formed by an electric circuit, such as an inverter. The rotor 22 is rotatably disposed in a manner opposed to the stator 21.

In the rotating machine 20, when electric power is supplied from the battery 52 via the PDU 51, a rotating magnetic field is generated in the stator 21 to thereby rotate the rotor 22. Further, when no electric power is supplied to the rotating machine 20, if the rotor 22 is rotated with respect to the stator 21, a rotating magnetic field is generated in the stator 21 to generate electric power. The ECU 2 controls the PDU 51 to thereby control the electric power supplied to the rotating machine 20, the electric power generated in the rotating machine 20, the rotational speed NM of the rotor 22 (hereinafter referred to as "the rotating machine speed NM"), and the torque of the rotating machine 20 (hereinafter referred to as "the rotating machine torque").

The first planetary gear unit PS1 is comprised of a first sun gear S1, a first ring gear R1 that is rotatably provided on an outer periphery of the first sun gear S1 and has a larger number of gear teeth than those of the first sun gear S1, a plurality of (e.g. three) first planetary gears P1 (only two of which are shown) in mesh with the gears S1 and R1, and a first carrier C1 that rotatably supports the first planetary gears P1. Hereinafter, the first sun gear S1, the first ring gear R1, and the first carrier C1 are generically referred to as "the three elements of the first planetary gear unit PS1". Further, the second planetary gear unit PS2 is constructed similarly to the first planetary gear unit PS1, and is comprised of a second sun gear S2, a second ring gear R2, a plurality of (e.g. three) second planetary gears P2 (only two of which are shown) in mesh with the gears S2 and R2, and a second carrier C2 that rotatably supports the second planetary gears P2. Hereinafter, the second sun gear S2, the second ring gear R2 and the second carrier C2 are generically referred to as "the three elements of the second planetary gear unit PS2".

Although in the present embodiment, the first and second sun gears S1 and S2 have the same number of gear teeth and the first and second ring gears R1 and R2 have the same number of gear teeth, they are not necessarily required to have the same number of gear teeth.

Further, the above-described first carrier C1 is integrally formed with a first connection shaft 4. The first connection shaft 4 is rotatably supported by bearings, not shown, and has one end thereof concentrically connected to a crankshaft, not shown, of the engine 3 and the other end thereof concentrically connected to a second connection shaft 5 via a neutral clutch NC. The second connection shaft 5 is rotatably supported by bearings, not shown, and is integrally formed with the second sun gear S2. The neutral clutch NC is formed by a friction multiple disk clutch, and the degree of engagement of the neutral clutch NC with the first connection shaft 4 and the second connection shaft 5 is controlled by the ECU 2 (see FIG. 2), described hereinafter, to thereby connect and disconnect between the first connection shaft 4 and the second connection shaft 5. With this arrangement, when the neutral clutch NC is engaged, the second sun gear S2 is connected to the first carrier C1 and the crankshaft.

Furthermore, the first connection shaft 4 is provided with an electromagnetic brake BR. The electromagnetic brake BR is turned on or off by the ECU 2. In its ON state, the electromagnetic brake BR holds the first connection shaft 4 in an unrotatable state, whereas in the OFF state, the electromagnetic brake BR allows the rotation of the first connection shaft 4.

Further, the above-mentioned first sun gear S1 and second carrier C2 are integrally formed with a third connection shaft 6. The third connection shaft 6 is formed to be hollow, and is rotatably supported by bearings, not shown. The above-mentioned second connection shaft 5 is rotatably fitted in the third connection shaft 6. Further, the third connection shaft 6 is integrally formed with a gear 6a. The gear 6a is in mesh with a gear 9a of the differential gear mechanism 9 via an idler gear, not shown. As described above, the first sun gear S1 and the second carrier C2 are connected to each other via the third connection shaft 6, and are connected to the drive wheels DW and DW e.g. by the gear 6a and the differential gear mechanism 9.

The torque converter 30 is of a general type which transmits power using working fluid filled therein. More specifically, the torque converter 30 is comprised of a cover 31 in the form of a casing, a pump impeller 32 (input member) integrally formed with the cover 31, a turbine runner 33 (output member), a stator 34, and a lockup clutch 35 (clutch).

The pump impeller 32, the turbine runner 33, and the stator 34 are all formed by impellers, and are rotatably supported by bearings, not shown. The pump impeller 32 and the turbine runner 33 are arranged within the cover 31 such that they are opposed to each other with a slight gap therebetween. Further, the stator 34 is disposed between respective inner peripheries of the pump impeller 32 and the turbine runner 33. The above-mentioned lockup clutch 35 is formed by a friction clutch, and the degree of engagement of the lockup clutch 35 is controlled by oil pressure supplied to the lockup clutch 35. The lockup clutch 35 is disposed between the cover 31 and the turbine runner 33. An oil pump, not shown, which uses the engine 3 as a power source thereof, is connected to the lockup clutch 35 via an oil passage, not shown. The oil passage has an oil pressure control valve 35a disposed therein, which controls oil pressure supplied to the lockup clutch 35 under the control of the ECU 2. Thus, the degree of engagement of the lockup clutch 35 with the cover 31 and the turbine runner 33 is controlled to thereby connect and disconnect between the cover 31 and the turbine runner 33.

Figure 3:
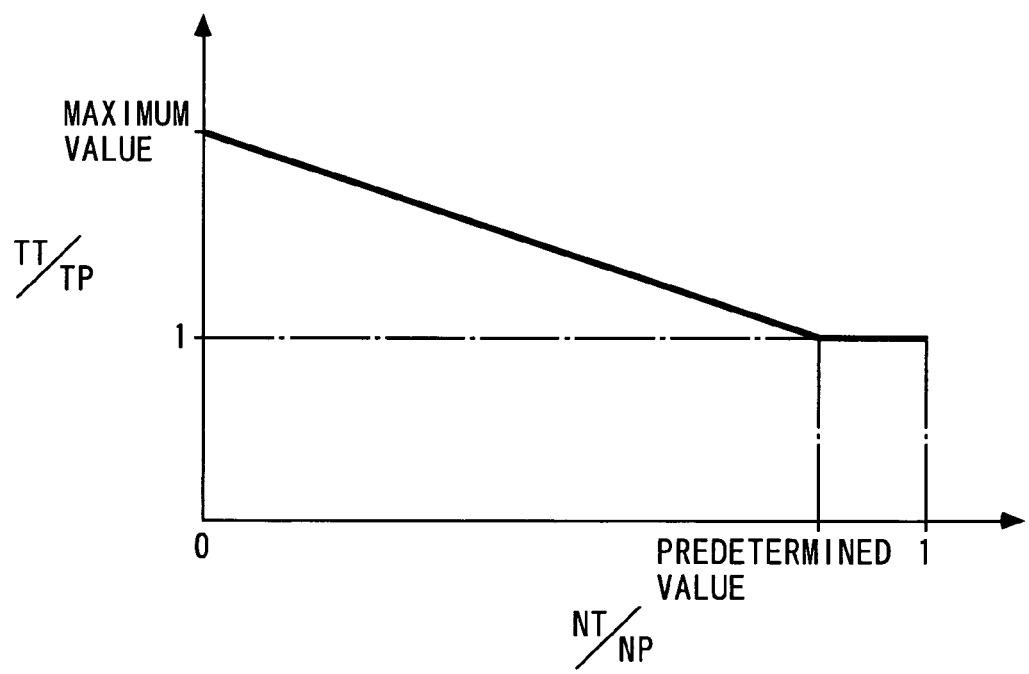
FIG. 3 is a diagram showing the relationship between a pump absorption torque, a turbine torque, a pump speed, and a turbine speed, with a lockup clutch being disengaged.

In the torque converter 30 constructed as above, during disengagement of the lockup clutch 35, power is transmitted between the pump impeller 32 and the turbine runner 33, using working fluid. FIG. 3 shows the relationship between input and output of the power transmitted from the pump impeller 32 to the turbine runner 33 during the disengagement of the lockup clutch 35. In FIG. 3, TP represents torque transmitted to the pump impeller 32 (hereinafter referred to as "the pump absorption torque"), TT represents torque transmitted to the turbine runner 33 (hereinafter referred to as "the turbine torque"), NP represents the rotational speed of the pump impeller 32 (hereinafter referred to as "the pump speed"), and NT represents the rotational speed of the turbine runner 33 (hereinafter referred to as "the turbine speed").

Referring to FIG. 3, when a ratio (NT/NP) between the turbine speed NT and the pump speed NP is not smaller than a predetermined value (e.g. 0.9) and at the same time not larger than 1, and the turbine speed NT is approximately equal to the pump speed NP, a ratio (TT/TP) between the turbine torque TT and the pump absorption torque TP becomes equal to 1. Further, when the turbine speed NT is lower than the pump speed NP, the pump absorption torque TP is transmitted to the turbine runner 33 by the stator 34 in an amplified state, and the degree of amplification of the pump absorption torque TP is larger as the turbine speed NT is lower than the pump speed NP. For this reason, the value of the ratio TT/TP becomes larger as the value of the ratio NT/NP is smaller. Furthermore, when NT/NP=0 holds, i.e. when the turbine runner 33 is not rotating though the pump impeller 32 is rotating, the value of the ratio TT/TP becomes equal to the maximum value (e.g. 2.0) larger than 1. The above-described relationship between the rotational speeds and the torques also holds when the power is transmitted from the turbine runner 33 to the pump impeller 32, inversely to the above.

Furthermore, the cover 31 and the turbine runner 33 are integrally and concentrically formed with an input shaft 7 and an output shaft 8, respectively. The input shaft 7 and the output shaft 8 are integrally formed with gears 7a and 8a, respectively. These gears 7a and 8a are in mesh with gears R1a and R2a which are formed on the outer peripheral surfaces of the first and second ring gears R1 and R2, respectively. As described above, the first and second ring gears R1 and R2 are connected to each other via the torque converter 30. Further, the output shaft 8 is integrally formed with the above-described rotor 22 of the rotating machine 20. With this arrangement, the rotor 22 is rotatable in unison with the turbine runner 33 and the second ring gear R2.

Figure 2:
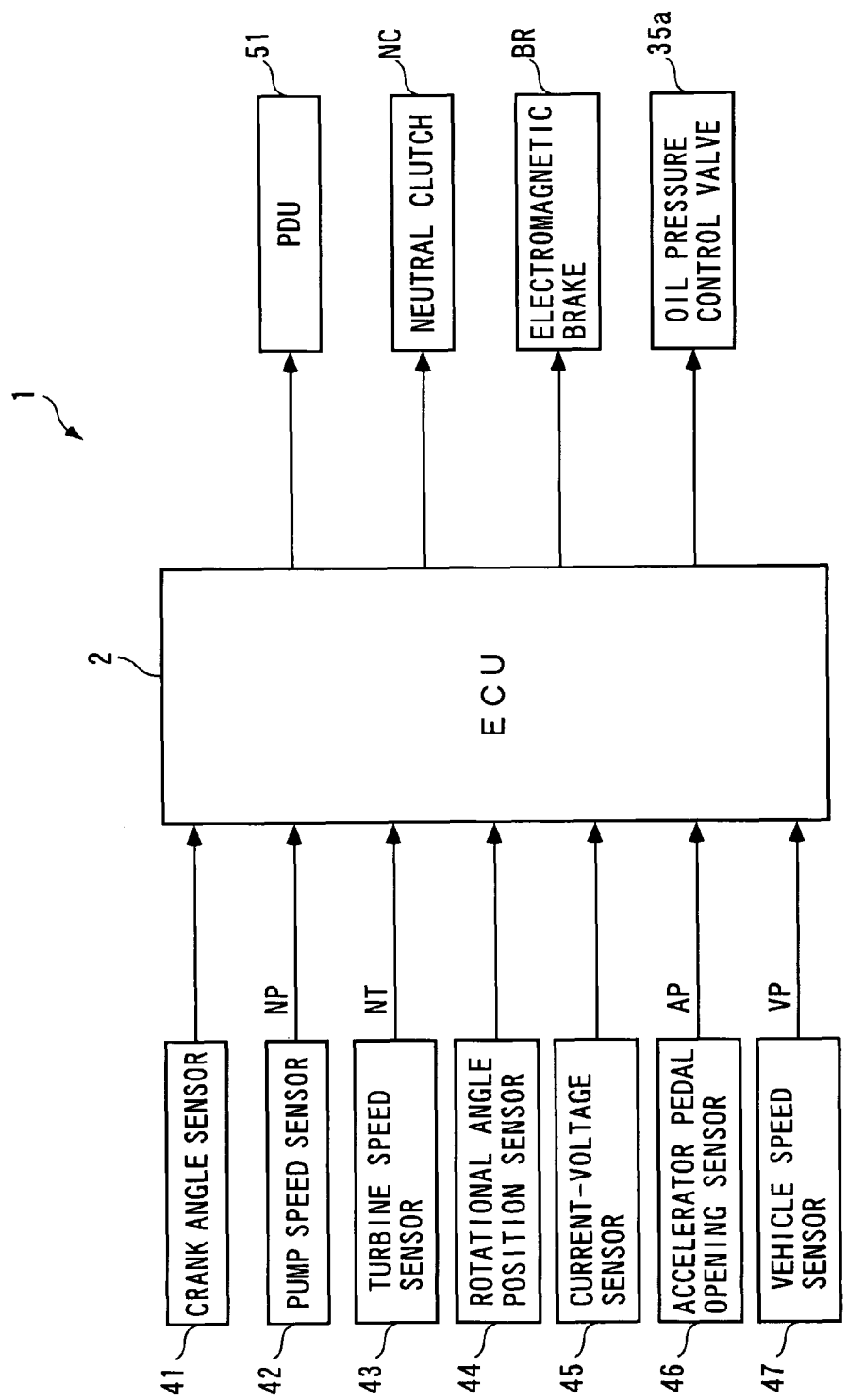
FIG. 2 is a block diagram of part of the power unit according to the first embodiment.

Referring to FIG. 2, a crank angle sensor 41 detects the crank angle position of the crankshaft, and delivers a signal indicative of the detected crank angle position to the ECU 2. The ECU 2 calculates the rotational speed NE of the engine 3 (hereinafter referred to as "the engine speed NE") based on the crank angle position. Further, a pump speed sensor 42 detects the pump speed NP, and delivers a signal indicative of the detected pump speed NP to the ECU 2, and a turbine speed sensor 43 detects the turbine speed NT, and delivers a signal indicative of the detected turbine speed NT to the ECU 2.

Further, a rotational angle position sensor 44 detects the rotational angle position of the rotor 22 of the rotating machine 20, and delivers a signal indicative of the detected rotational angle position to the ECU 2. The ECU 2 calculates the rotating machine speed NM based on the signal from the rotational angle position sensor 44. Furthermore, a current-voltage sensor 45 detects the values of electric current and voltage input to and output from the battery 52, and delivers signals indicative of the detected values of the electric current and voltage. The ECU 2 calculates the remaining capacity SOC of the battery 52 based on the signals from the current-voltage sensor 45. Further, an accelerator pedal opening sensor 46 detects an accelerator pedal opening AP, which is a stepped-on amount of an accelerator pedal, not shown, of the vehicle, and delivers a signal indicative of the detected accelerator pedal opening AP to the ECU 2. A vehicle speed sensor 47 detects a vehicle speed VP, and delivers a signal indicative of the detected vehicle speed VP to the ECU 2.

The ECU 2 is implemented by a microcomputer comprised of an I/O interface, a CPU, a RAM, and a ROM, and controls the operations of the engine 3 and the rotating machine 20 based on the signals from the aforementioned sensors 41 to 47.

Figure 4:
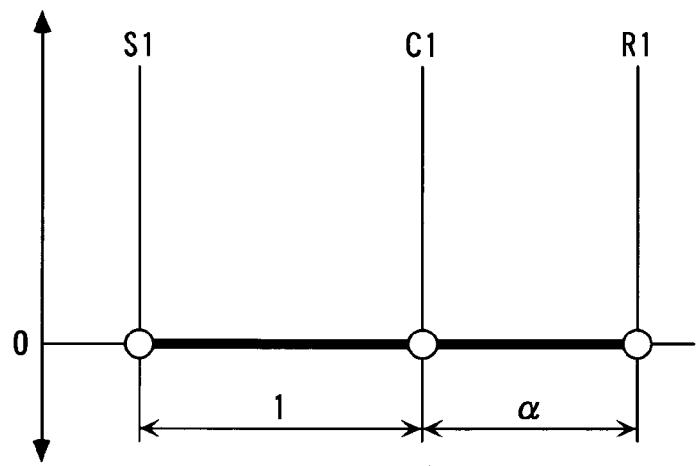
FIG. 4 is a view showing a collinear chart illustrating an example of the relationship between the respective rotational speeds of three elements of a first planetary gear unit, together with a collinear chart illustrating an example of the relationship between the respective rotational speeds of three elements of a second planetary gear unit.
Figure 4:
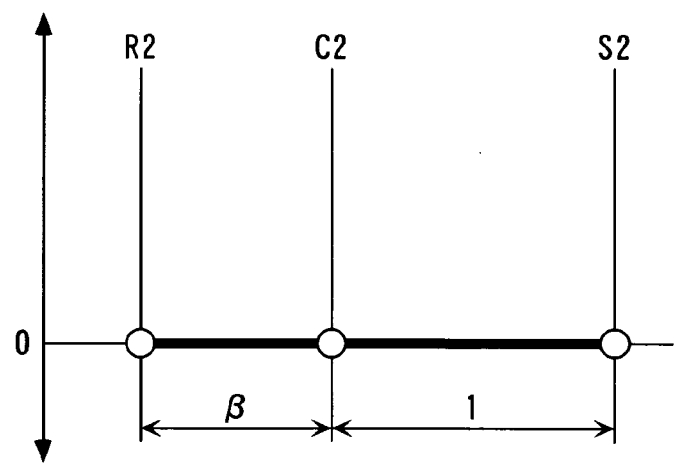

FIG. 4 shows a collinear chart illustrating an example of the relationship between the respective rotational speeds of the three elements of the first planetary gear unit PS1, together with a collinear chart illustrating an example of the relationship between the respective rotational speeds of the three elements of the second planetary gear unit PS2. In each collinear chart, the three elements are shown in a manner arranged side by side in the direction of the horizontal axis, and the rotational speeds thereof are shown by the vertical axis, while the distances between the three elements of the first planetary gear unit PS1 in the direction of the horizontal axis are defined based on the number of the gear teeth of the first sun gear S1 and that of the gear teeth of the first ring gear R1, and the distances between the three elements of the second planetary gear unit PS2 in the direction of the horizontal axis are defined based on the number of the gear teeth of the second sun gear S2 and that of the gear teeth of the second ring gear R2. In FIG. 4, α represents a ratio between the number of the gear teeth of the first sun gear S1 and that of the gear teeth of the first ring gear R1, and β represents a ratio between the number of the gear teeth of the second sun gear S2 and that of the gear teeth of the second ring gear R2.

As described hereinbefore, the first sun gear S1 and the second carrier C2 are connected to each other, and are connected to the drive wheels DW and DW e.g. by the gear 6a, and hence if a change in speed e.g. by the gear 6a is ignored, the respective rotational speeds of the first sun gear S1 and the second carrier C2, and the respective rotational speeds of the drive wheels DW and DW, i.e. the vehicle speed VP are equal to each other. Further, since the first ring gear R1 and the pump impeller 32 are connected to each other e.g. by the gear 7a, if a change in speed e.g. by the gear 7a is ignored, the rotational speed of the first ring gear R1 and the pump speed NP are equal to each other. Furthermore, since the turbine runner 33 and the rotor 22 are connected to each other, and are connected to the second ring gear R2 e.g. by the gear 8a, if a change in speed e.g. by the gear 8a is ignored, the turbine speed NT, the rotating machine speed NM, and the rotational speed of the second ring gear R2 are equal to each other.

Figure 5:
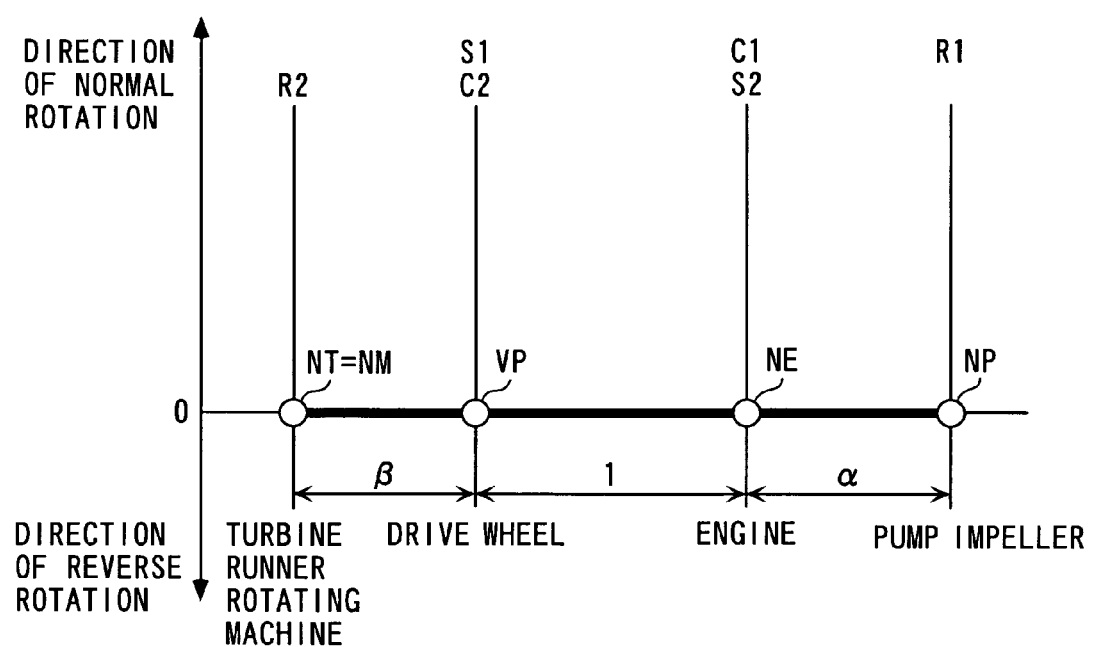
FIG. 5 is a view showing a collinear chart illustrating an example of the relationship between the respective rotational speeds of the three elements of each of the first and second planetary gear units, the pump speed, an engine speed, a vehicle speed, the turbine speed, and a rotating machine speed of the FIG. 1 power unit, with a neutral clutch being engaged.

Further, the crankshaft of the engine 3 and the first carrier C1 are connected to each other, and when the neutral clutch NC is engaged, the second sun gear S2 is connected to the crankshaft of the engine 3 and the first carrier C1, so that the engine speed NE, the rotational speed of the first carrier C1, and the rotational speed of the second sun gear S2 are equal to each other. From the above, when the neutral clutch NC is engaged, the relationship between the respective rotational speeds of the three elements of the first planetary gear unit PS1, those of the three elements of the second planetary gear unit PS2, the engine speed NE, the vehicle speed VP, the pump speed NP, the turbine speed NT, and the rotating machine speed NM is represented by such a single collinear chart as shown e.g. in FIG. 5.

It should be noted that assuming that the direction of rotation of the crankshaft of the engine 3 is the same as the direction of normal rotation of the drive wheels DW and DW, hereinafter, as for each of all the rotary elements of the power unit 1 and the drive wheels DW and DW, the same direction as the direction of rotation of the crankshaft is referred to as "the direction of normal rotation" and the opposite direction to the direction of rotation of the crankshaft is referred to as "the direction of reverse rotation" concerning the same. Further, as for the same, the rotation in the direction of normal rotation and the rotation in the direction of reverse rotation are referred to as "the normal rotation" and "the reverse rotation", respectively.

In the present embodiment, a first-element corresponds to the first sun gear S1, a second element to the first carrier C1, a third element to the first ring gear R1, a fourth element to the second sun gear S2, a fifth element to the second carrier C2, and a sixth element to the second ring gear R2.

Figure 6:
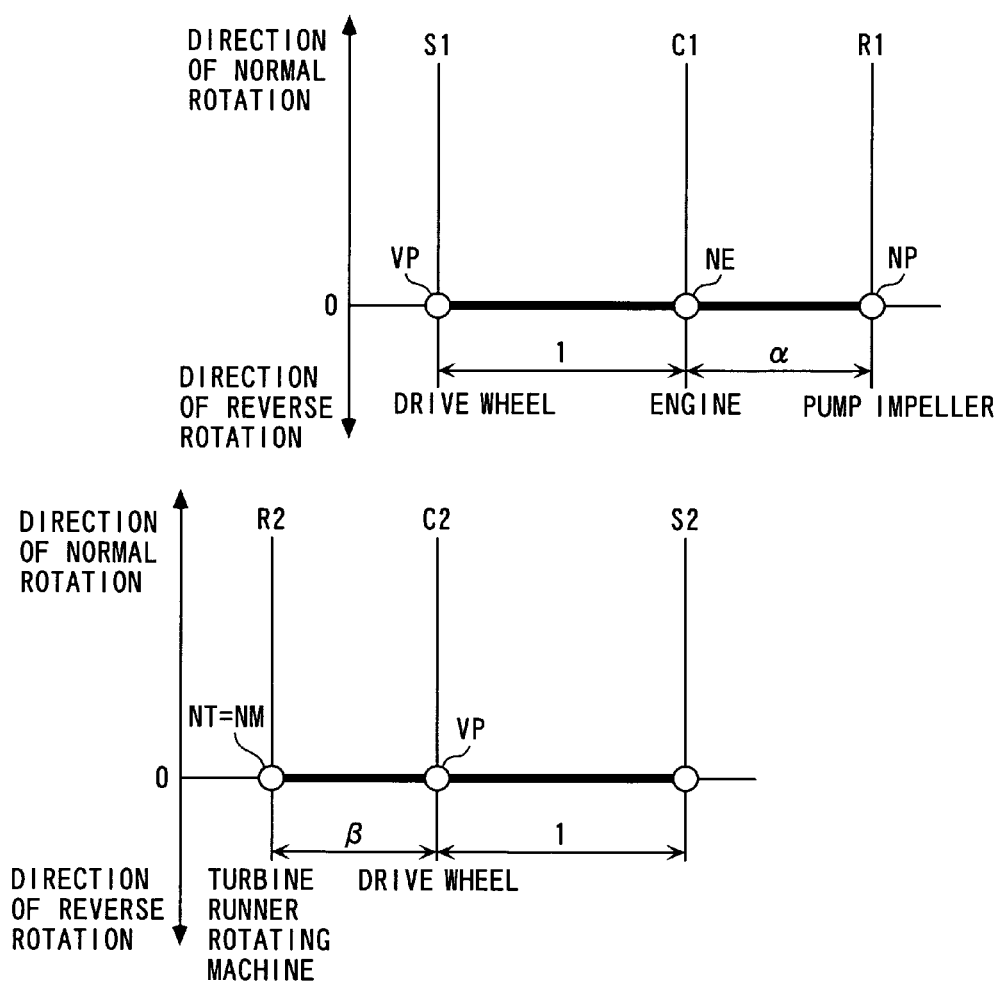
FIG. 6 is a view showing a collinear chart illustrating an example of the relationship between the respective rotational speeds of the three elements of each of the first and second planetary gear units, the pump speed, the engine speed, the vehicle speed, the turbine speed, and the rotating machine speed of the FIG. 1 power unit, with the neutral clutch being disengaged.

On the other hand, when the neutral clutch NC is disengaged, the crankshaft of the engine 3 and the first carrier C1 are disconnected from the second sun gear S2, so that sometimes the rotational speed of the second sun gear S2 is not equal to the engine speed NE and the rotational speed of the first carrier C1. As a result, when the neutral clutch NC is disengaged, the relationship between the respective rotational speeds of the three elements of the first planetary gear unit PS1, those of the three elements of the second planetary gear unit PS2, the engine speed NE, the vehicle speed VP, the pump speed NP, the turbine speed NT, and the rotating machine speed NM is represented by such two collinear charts as shown e.g. in FIG. 6.

Hereinafter, operations of the power unit 1 during stoppage of the vehicle and during traveling thereof will be described with reference to the above-described collinear charts, and so forth. First, a description will be given of an operation of the power unit 1 when the vehicle is caused to travel using only the rotating machine 20 as a power source thereof. Hereinafter, such traveling of the vehicle will be referred to as "the EV traveling". During EV traveling, the neutral clutch NC is engaged to thereby connect the second sun gear S2 to the first carrier C1 and the crankshaft of the engine 3. Further, the electromagnetic brake BR is controlled to the ON state, whereby the crankshaft, the first carrier C1 and the second sun gear S2 thus connected to each other are held unrotatable, and the lockup clutch 35 is disengaged. In this state, electric power is supplied to the rotating machine 20 to cause the rotating machine 20 to perform the normal rotation.

Figure 7:
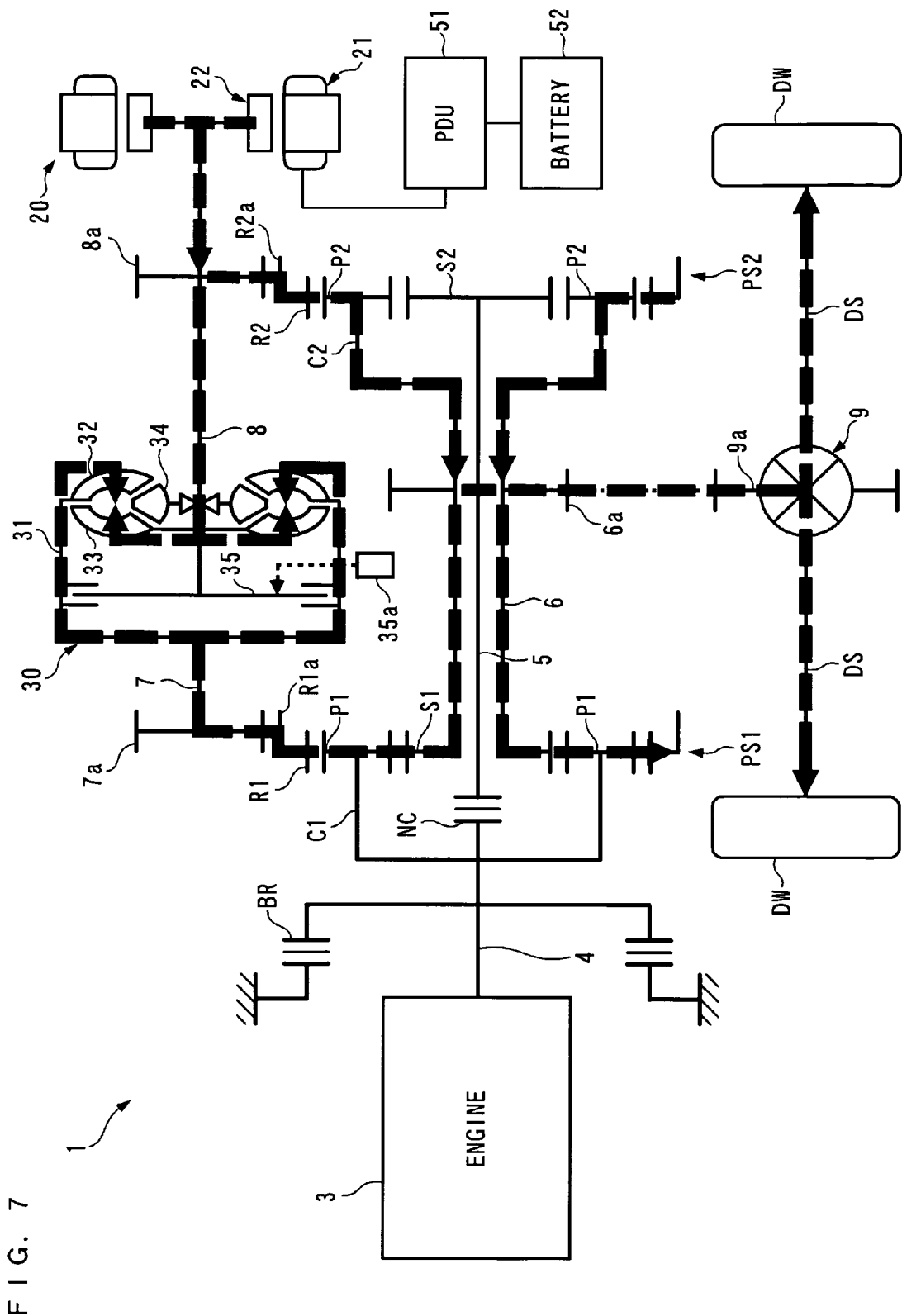
FIG. 7 is a view showing conditions of transmission of torques in the FIG. 1 power unit during EV traveling.

As described above, during EV traveling, as shown in FIG. 7, part of the rotating machine torque is transmitted to the turbine runner 33 to thereby cause the turbine runner 33 to perform the normal rotation. Further, since the second sun gear S2 is held unrotatable, as described above, the remainder of the rotating machine torque is transmitted to the second carrier C2 via the second ring gear R2 and the second planetary gears P2. Further, since the first carrier C1 is held unrotatable as described above, part of the torque transmitted to the second carrier C2 is transmitted to the first ring gear R1 via the first sun gear S1 and the first planetary gears P1, and then transmitted to the pump impeller 32 to cause the first ring gear R1 and the pump impeller 32 to perform the reverse rotation. Further, the remainder of the torque transmitted to the second carrier C2 is transmitted to the drive wheels DW and DW via the gear 6a, the differential gear mechanism 9, etc. to cause the drive wheels DW and DW to perform the normal rotation. As described above, the power from the rotating machine 20 is transmitted to the drive wheels DW and DW without via the torque converter 30.

Figure 8:
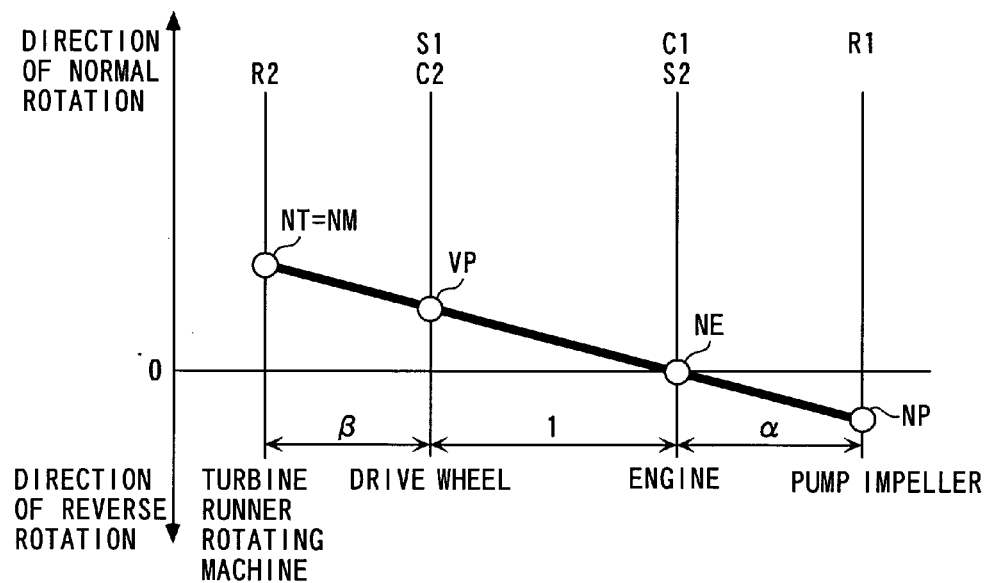
FIG. 8 is a view showing a collinear chart illustrating an example of the relationship between the pump speed, the engine speed, the vehicle speed, the turbine speed, and the rotating machine speed of the FIG. 1 power unit during EV traveling.

As a result, as shown in FIG. 8, in a state in which the engine speed NE is equal to 0, i.e. the engine 3 is at a stop, the vehicle speed VP is increased to permit the vehicle to travel. In this case, as shown in FIG. 8, although the pump impeller 32 and the turbine runner 33 rotate in the opposite directions, the working fluid is interposed between the pump impeller 32 and the turbine runner 33, which enables the vehicle to perform the EV traveling without any difficulty. It should be noted that in FIG. 7 and other figures showing conditions of transmission of torque, described hereinafter, thick broken lines with arrows indicate the flows of the torque.

Next, a description will be given of an operation of the power unit 1, which is performed for starting the engine 3 during EV traveling. Hereinafter, such starting of the engine 3 is referred to as "the ENG start during EV traveling". At the time of the ENG start during EV traveling, the engagement of the neutral clutch NC is held, and the electromagnetic brake BR having been controlled to the ON state as described above is controlled to the OFF state to thereby allow the crankshaft, the first carrier C1 and the second sun gear S2 to rotate. Further, the lockup clutch 35 having been disengaged from the cover 31 and the turbine runner 33 is progressively engaged therewith, to thereby cause the rotating machine speed NM to be reduced and the rotating machine torque to be increased.

Thus, part of the rotating machine torque is transmitted to the first ring gear R1 via the torque converter 30, and the remainder of the same is transmitted to the second ring gear R2, and is combined with torque transmitted to the second sun gear S2 as described hereinafter. Then, the combined torque is transmitted to the second carrier C2. Part of the torque transmitted to the second carrier C2 is transmitted to the drive wheels DW and DW, while the remainder of the same is transmitted to the first sun gear S1, and is combined with the torque transmitted to the first ring gear R1 as described above. Then, the combined torque is transmitted to the first carrier C1. Part of the torque transmitted to the first carrier C1 is transmitted to the engine 3, and the remainder of the same is transmitted to the second sun gear S2.

Figure 9:
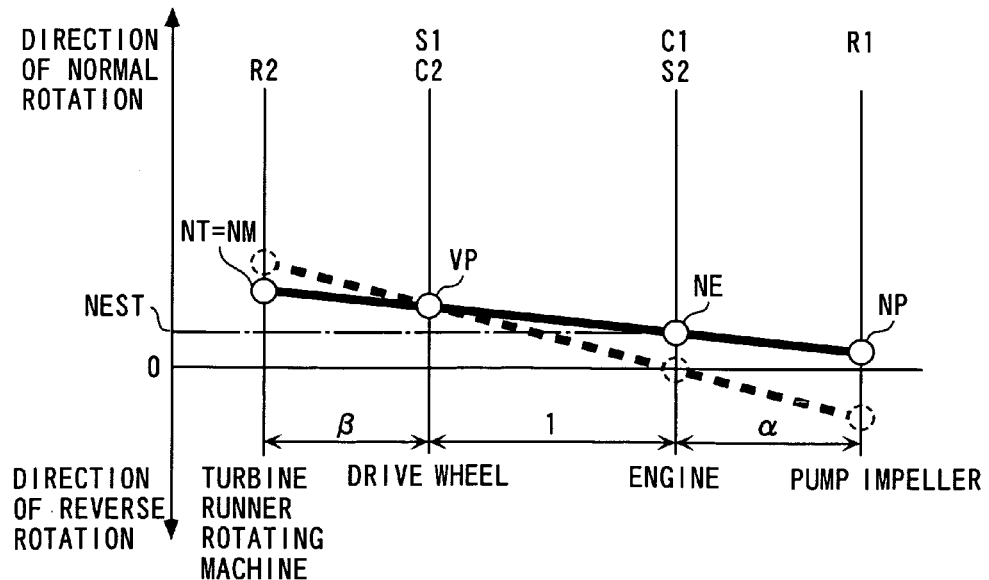
FIG. 9 is a view showing a collinear chart illustrating an example of the relationship between the pump speed, the engine speed, the vehicle speed, the turbine speed, and the rotating machine speed of the FIG. 1 power unit at the time of the ENG start during EV traveling.

As a result, as indicated by a broken line in FIG. 9, the engine speed NE, which has been equal to 0, is increased as indicated by a solid line in FIG. 9. In this state, the engine 3 is started by controlling fuel injection valves, not shown, and ignition operations by respective spark plugs, not shown, of the engine 3 according to the aforementioned crank angle position. In this case, the degree of engagement of the lockup clutch 35, the rotating machine speed NM, and the rotating machine torque are controlled such that the vehicle speed VP is held at a value at the time, and at the same time the engine speed NE becomes equal to a predetermined start-time speed NEST suitable for starting the engine 3.

Next, a description will be given of an operation of the power unit 1, which is performed for starting the engine 3 during stoppage of the vehicle. Hereinafter, such starting of the engine 3 is referred to as "the ENG start during stoppage of the vehicle". At the time of the ENG start during stoppage of the vehicle, the neutral clutch NC is engaged to thereby connect the crankshaft, the first carrier C1 and the second sun gear S2 to each other, and the electromagnetic brake BR is controlled to the OFF state to thereby allow the crankshaft, the first carrier C1 and the second sun gear S2 to rotate. Further, the lockup clutch 35 is disengaged, and electric power is supplied to the rotating machine 20 to thereby cause the rotating machine 20 to perform the reverse rotation.

During stoppage of the vehicle, the drive wheels DW and DW are held unrotatable by respective brakes associated therewith, not shown, and the first sun gear S1 and the second carrier C2 connected to the drive wheels DW and DW are also held unrotatable. Therefore, part of the rotating machine torque is transmitted to the second sun gear S2 via the second ring gear R2 and the second planetary gears P2, to thereby cause the second sun gear S2 to perform the normal rotation. Further, the remainder of the rotating machine torque is transmitted to the turbine runner 33 to cause the turbine runner 33 to perform the reverse rotation. Furthermore, since the first sun gear S1 is held unrotatable as described above, part of the torque transmitted to the second sun gear S2 as described above is transmitted to the pump impeller 32 via the first carrier C1, the first planetary gears P1 and the first ring gear R1, to cause the pump impeller 32 to perform the normal rotation. Further, the remainder of the torque transmitted to the second sun gear S2 is transmitted to the crankshaft to cause the crankshaft to perform the normal rotation.

Figure 10:
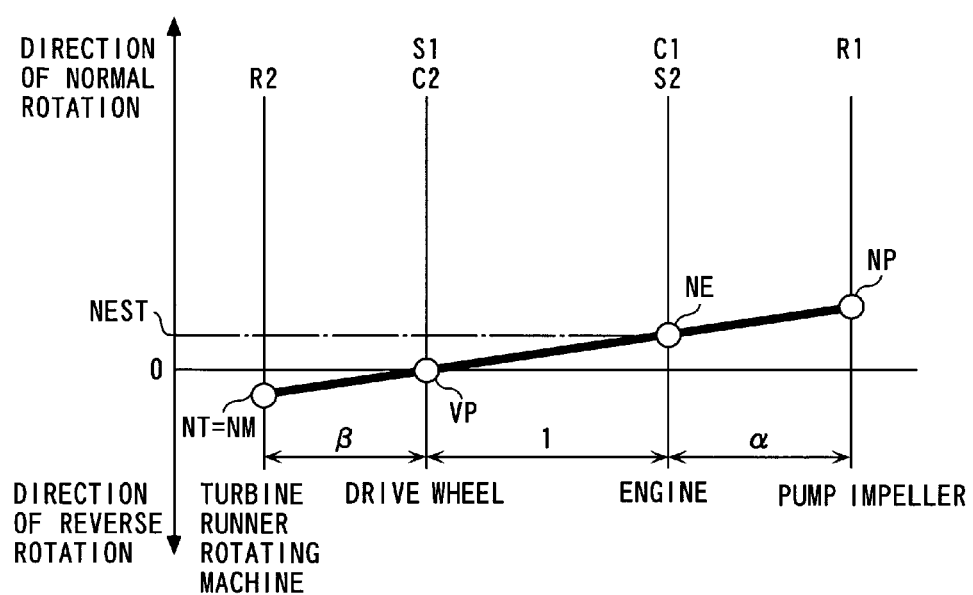
FIG. 10 is a view showing a collinear chart illustrating an example of the relationship between the pump speed, the engine speed, the vehicle speed, the turbine speed, and the rotating machine speed of the FIG. 1 power unit at the time of the ENG start time during stoppage of the vehicle.

As a result, as shown in FIG. 10, the engine speed NE is increased in a state in which the vehicle speed is equal to 0, i.e. the engine 3 is at a stop. In this state, the engine 3 is started by controlling the fuel injection valves and ignition operations by the respective spark plugs according to the crank angle position. In this case, the rotating machine speed NM and the rotating machine torque are controlled such that the engine speed NE becomes equal to the above-described start-time speed NEST. Further, if power transmission losses in the respective gears are ignored, torque transmitted to the engine 3 becomes equal to a value obtained by multiplying the rotating machine torque by α, i.e. the ratio between the number of the gear teeth of the first sun gear S1 and that of the gear teeth of the first ring gear R1. It should be noted that in this case, as shown in FIG. 10, although the pump impeller 32 and the turbine runner 33 rotate in the opposite directions, the working fluid is interposed between the pump impeller 32 and the turbine runner 33, which makes it possible to start the engine 3 during stoppage of the vehicle without any difficulty.

Next, a description will be given of an operation of the power unit 1 during idling of the engine 3. During idling of the engine 3, the neutral clutch NC is disengaged to thereby disconnect the crankshaft and the first carrier C1 from the second sun gear S2, and the electromagnetic brake BR is controlled to the OFF state to thereby allow the crankshaft and the first carrier C1 to rotate. Further, the lockup clutch 35 is disengaged, and the engine speed NE is controlled to a predetermined idle speed NIDLE.

During idling of the engine 3, similarly to during stoppage of the vehicle, the first sun gear S1 is held unrotatable, so that the rotation of the engine 3 transmitted to the first carrier C1 is transmitted to the second ring gear R2 via the first planetary gears P1, the first ring gear R1 and the torque converter 30. In this case, the engine 3 and the second sun gear S2 are disconnected from each other, and similarly to during stoppage of the vehicle, the second carrier C2 is held unrotatable, and hence the rotation of the engine 3 transmitted to the second ring gear R2 is transmitted to the second sun gear S2 via the second planetary gears P2.

Figure 11:
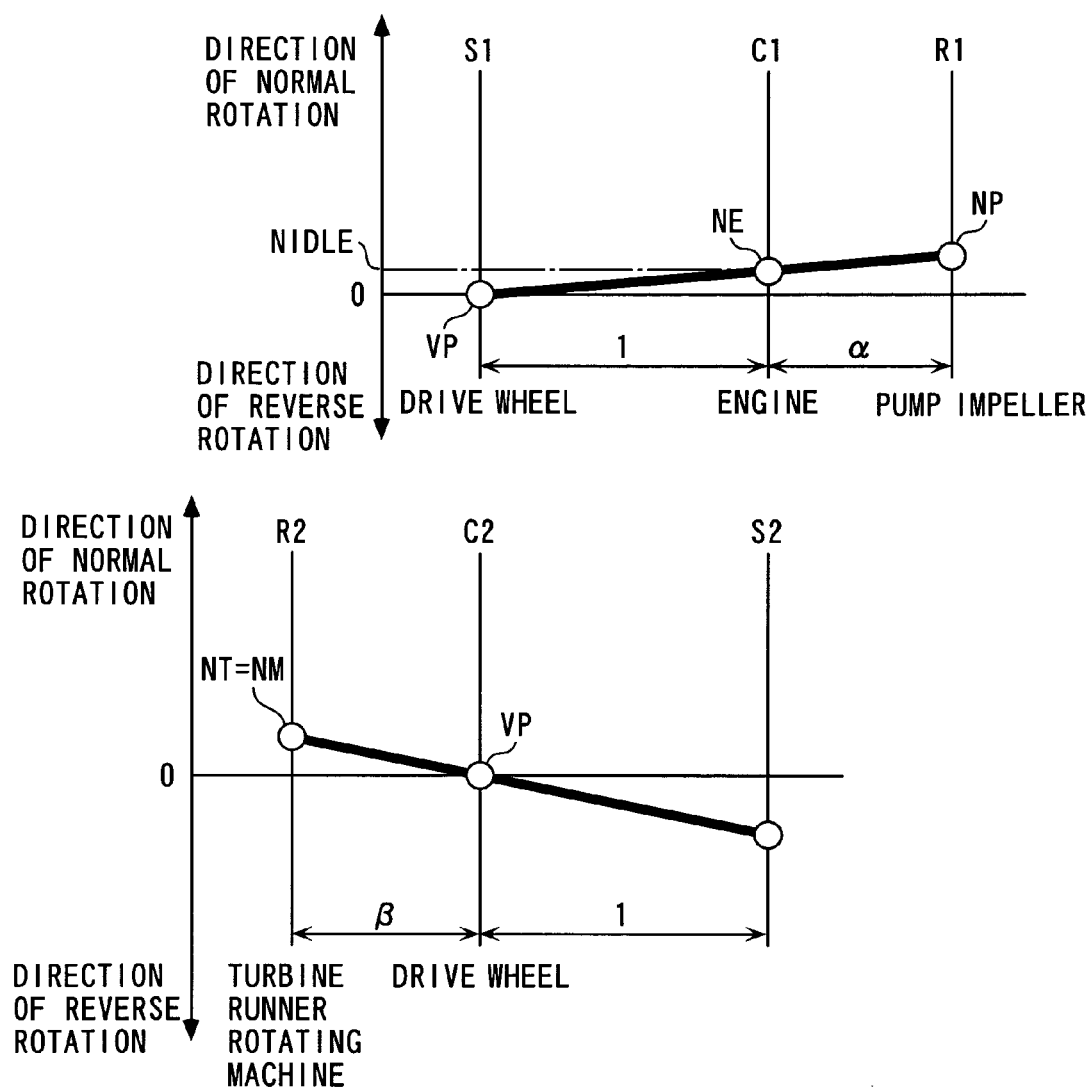
FIG. 11 is a view showing a collinear chart illustrating an example of the relationship between the pump speed, the engine speed, the vehicle speed, the turbine speed, and the rotating machine speed of the FIG. 1 power unit during idling.

As a result, as shown in FIG. 11, during idling of the engine 3, the engine speed NE is held at the predetermined idle speed NIDLE, and the vehicle speed VP is held at 0. Further, the rotational speeds of the first sun gear S1 and the second carrier C2 become equal to 0, and the first carrier C1, the first ring gear R1, the second ring gear R2, the pump impeller 32 and the turbine runner 33 all rotate without load in the direction of normal rotation, while the second sun gear S2 rotates without load in the direction of reverse rotation.

Next, a description will be given of an operation of the power unit 1, which is performed when the vehicle is started after the above-described idling of the engine 3. During this start of the vehicle, the neutral clutch NC disengaged during idling of the engine 3 is progressively engaged. Further, the electromagnetic brake BR and the lockup clutch 35 are controlled similarly to during idling of the engine 3.

Figure 12:
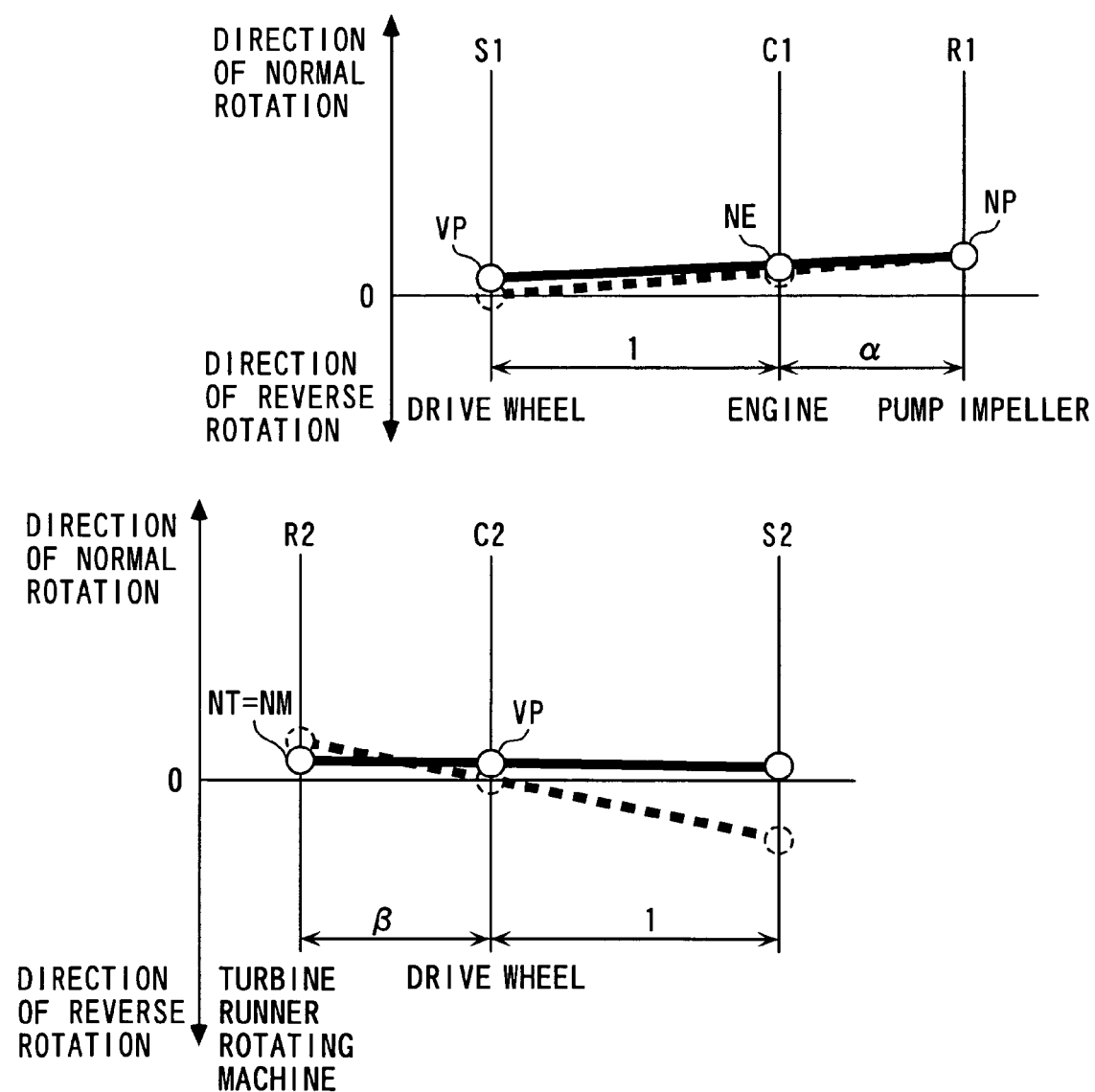
FIG. 12 is a view showing a collinear chart illustrating an example of the relationship between the pump speed, the engine speed, the vehicle speed, the turbine speed, and the rotating machine speed of the FIG. 1 power unit at thee start of the vehicle.

Thus, during the start of the vehicle, part of the torque of the engine 3 (hereinafter referred to as "the engine torque") is transmitted to the second sun gear S2, whereby as indicated by a solid line in FIG. 12, the rotational speed of the second sun gear S2 is increased from a state thereof during idling of the engine 3, indicated by a broken line in FIG. 12, and the second sun gear S2 rotates in the direction of normal rotation. Further, the torque transmitted to the second sun gear S2 as described above, acts on the second ring gear R2 such that the second ring gear R2 is caused to perform the reverse rotation, whereby the rotational speed of the second ring gear R2 is reduced from the state thereof during idling of the engine 3 until it becomes lower than the rotational speed of the first ring gear R1. Accordingly, the turbine speed NT becomes lower than the pump speed NP, whereby as is clear from the aforementioned characteristics of the torque converter 30, the turbine torque TT is increased to increase torque transmitted to the second ring gear R2. Further, combined torque formed by combining the thus increased torque transmitted to the second ring gear R2 and the torque transmitted to the second sun gear S2 as described above is transmitted to the second carrier C2. Furthermore, the remainder of the engine torque is transmitted to the first carrier C1, and then is distributed to the first ring gear R1 and the first sun gear S1. Further, the torques transmitted to the second carrier C2 and the first sun gear S1 as described above are combined at the third connection shaft 6. Then, the combined torque is transmitted to the drive wheels DW and DW. Consequently, as indicated by a solid line in FIG. 12, the vehicle speed VP is increased from a state during idling of the engine 3, as indicated by a broken line in FIG. 12, causing the vehicle to start.

Next, a description will be given of an operation of the power unit 1, which is performed when the vehicle is caused to travel mainly using the power from the engine 3 (hereinafter referred to as "the engine power"). Hereinafter, such traveling of the vehicle is referred to as "ENG traveling". During ENG traveling, the neutral clutch NC is engaged to thereby connect the crankshaft, the first carrier C1 and the second sun gear S2 to each other, and the electromagnetic brake BR is turned off to allow the crankshaft, the first carrier C1 and the second sun gear S2 thus connected to each other to rotate. Further, the engagement and disengagement of the lockup clutch 35 is controlled according to the vehicle speed VP etc. Furthermore, the engine power is controlled according to the vehicle speed VP and a demanded torque PMCMD such that excellent fuel economy can be obtained. The demanded torque PMCMD is calculated by searching a map, not shown, according to the vehicle speed VP and the accelerator pedal opening AP.

Figure 13:
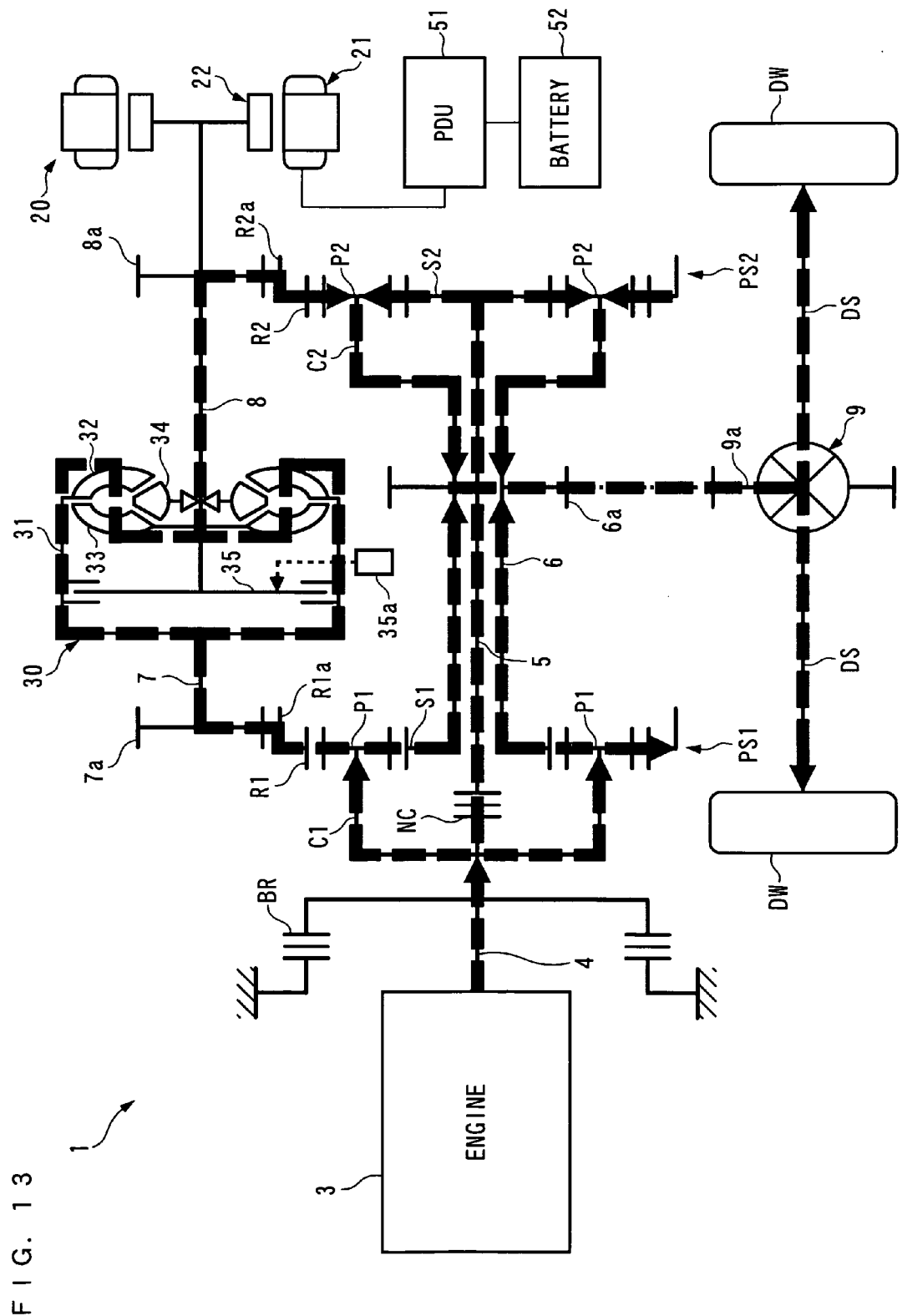
FIG. 13 is a view showing conditions of transmission of torques in the FIG. 1 power unit, with the lockup clutch being disengaged during ENG traveling.

FIG. 13 shows conditions of transmission of the engine torque in a state in which the lockup clutch 35 is disengaged during ENG traveling. As shown in FIG. 13, part of the engine torque is transmitted to the first carrier C1, and the remainder thereof is transmitted to the second sun gear S2. The torque transmitted to the first carrier C1 is distributed to the first ring gear R1 and the first sun gear S1. The torque distributed to the first ring gear R1 is transmitted to the second ring gear R2 via the torque converter 30. The torque transmitted to the second ring gear R2 is combined with the torque transmitted to the second sun gear S2 as described above, and then the combined torque is transmitted to the second carrier C2. Further, the torques transmitted to the second carrier C2 and the first sun gear S1 as described are combined with each other, and then the combined torque is transmitted to the drive wheels DW and DW. Thus, the power transmitted to the drive wheels DW and DW during ENG traveling has the same magnitude as that of the engine power if power transmission losses in the respective gears are ignored.

Figure 14:
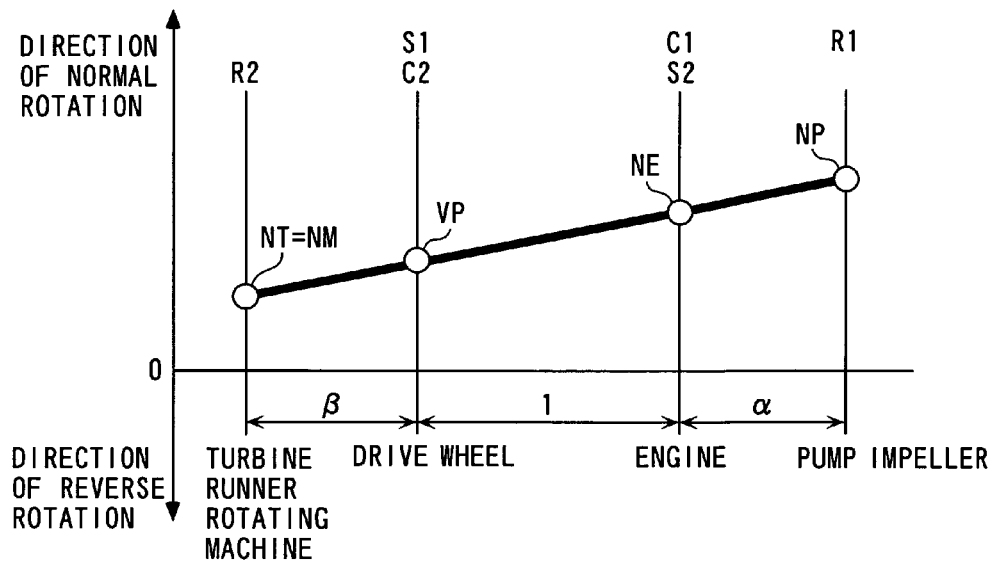
FIG. 14 is a view showing a collinear chart illustrating an example of the relationship between the pump speed, the engine speed, the vehicle speed, the turbine speed, and the rotating machine speed of the FIG. 1 power unit, with the lockup clutch being disengaged during ENG traveling.

FIG. 14 shows an example of the relationship between the respective rotational speeds of the three elements of each of the first and second planetary gear units PS1 and PS2, the engine speed NE, the vehicle speed VP, and so forth, in the state of the lockup clutch 35 being disengaged during ENG traveling, as exhibited at the time of acceleration of the vehicle. As shown in FIG. 14, although the engine speed NE increases in accordance with the acceleration of the vehicle, the vehicle speed VP is not immediately increases, and becomes lower than the engine speed NE. Further, the turbine speed NT becomes lower than the pump speed NP. As a consequence, the torque transmitted to the pump impeller 32, that is, the pump absorption torque TP is transmitted to the turbine runner 33 in an amplified state. As a result, the engine power is transmitted to the drive wheels DW and DW while steplessly reducing the speed thereof.

Furthermore, in this case, the rotational difference between the pump speed NP and the turbine speed NT is controlled by controlling the degree of engagement of the lockup clutch 35 according to the pump speed NP and the turbine speed NT, to thereby control the degree of decrease in the speed of the power which is transmitted from the engine 3 to the drive wheels DW and DW.

Figure 15:
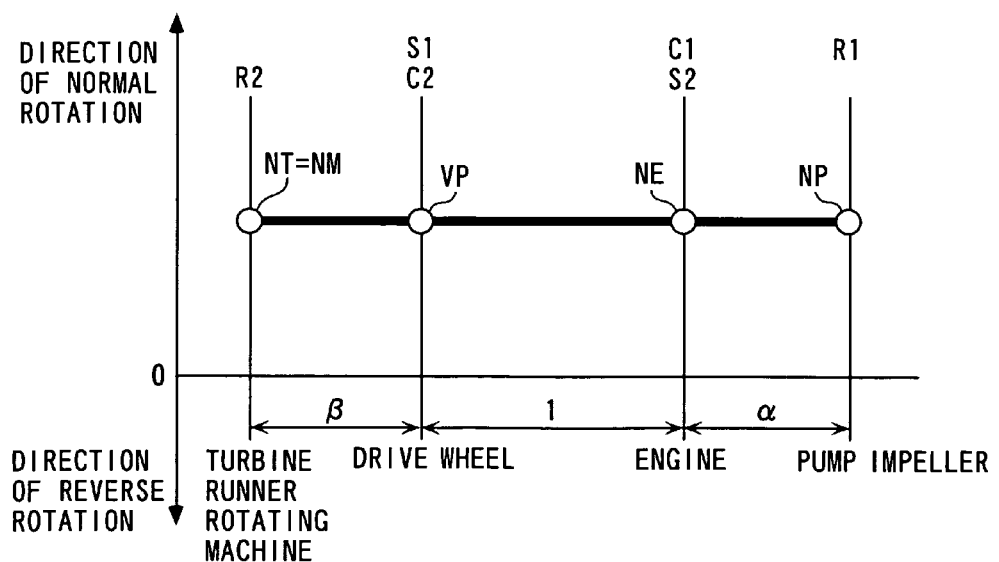
FIG. 15 is a view showing a collinear chart illustrating an example of the relationship between the pump speed, the engine speed, the vehicle speed, the turbine speed and the rotating machine speed of the FIG. 1 power unit, with the lockup clutch being engaged during ENG traveling.

Further, during ENG traveling, when the vehicle speed VP is higher than a predetermined lockup speed (e.g. 60 km/h), the lockup clutch 35 is completely engaged, whereby the first and second ring gears R1 and R2 are connected to each other. This makes, as shown in FIG. 15, the engine speed NE, the vehicle speed VP, the pump speed NP and the turbine speed NT equal to each other, causing the engine power to be transmitted to the drive wheels DW and DW without being changed in speed. In this case as well, the distribution and combining of the power, as described with reference to FIG. 13, is performed.

Of course, even if the lockup clutch 35 is held disengaged during ENG traveling, when the difference between the pump speed NP and the turbine speed NT becomes equal to 0 e.g. by continuation of traveling at a constant-speed, the engine power is transmitted to the drive wheels DW and DW without being changed in speed.

Furthermore, during ENG traveling, when the remaining capacity SOC of the battery 52 is larger than a predetermined value SOCREF, and at the same time the following condition (a) or (b) is satisfied, the vehicle is caused to travel while assisting the engine power by the rotating machine 20. Hereinafter, such traveling of the vehicle is referred to as "the assisted traveling". It should be noted that the above-described predetermined value SOCREF is set to a value with hysteresis.

(a) When the engine power that is controlled such that excellent fuel economy can be obtained, as described above, becomes short with respect to a demanded output determined according to the vehicle speed VP and the demanded torque PMCMD.

(b) When the demanded torque PMCMD is larger than the sum of the engine torque and a torque that is amplified by the torque converter 30 in accordance with a differential rotational speed between the pump impeller 32 and the turbine runner 33.

Further, during assisted traveling, the lockup clutch 35 is held in a disengaged state, and the rotating machine torque is controlled to the same magnitude as the magnitude of shortage of the engine power with respect to the above-described demanded output.

Figure 16:
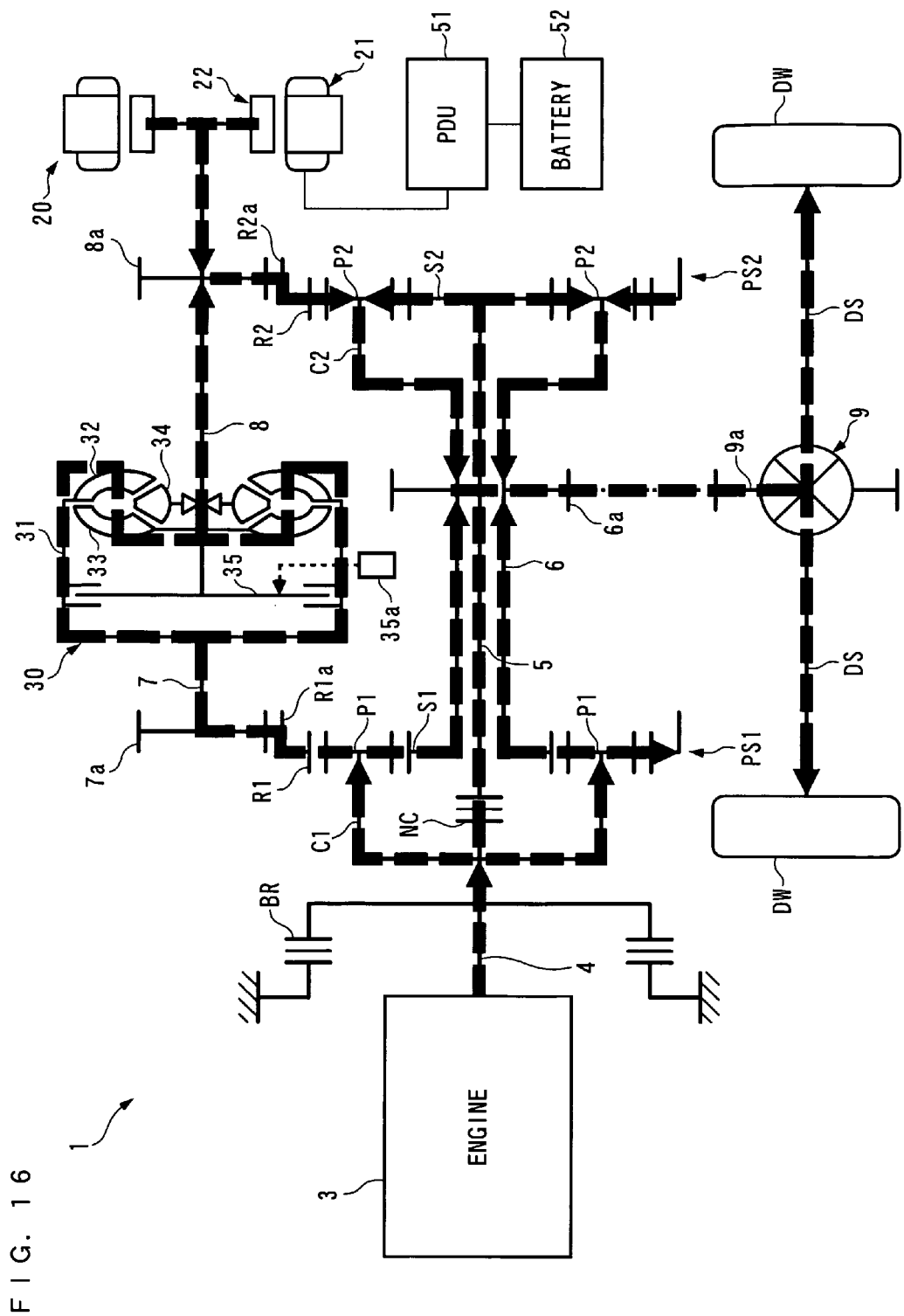
FIG. 16 is a view showing conditions of transmission of torques in the FIG. 1 power unit during assisted traveling.

FIG. 16 shows conditions of transmission of the torque during assisted traveling. Referring to FIG. 16, during assisted traveling, combined torque formed by combining the torque transmitted via the torque converter 30 as described above and the rotating machine torque is transmitted to the second ring gear R2. The torque transmitted to the second ring gear R2 is combined with the torque transmitted to the second sun gear S2 as described above, and then the combined torque is transmitted to the second carrier C2. Further, the torques transmitted to the second carrier C2 is combined with the engine torque distributed to the first sun gear S1 as described above, whereafter the combined torque is transmitted to the drive wheels DW and DW. Thus, during assisted traveling, the power transmitted to the drive wheels DW and DW has the same magnitude as that of the sum of the engine power and the power from the rotating machine 20 if power transmission losses in the respective gears are ignored.

Furthermore, when the condition (b) is satisfied, i.e. when the demanded torque PMCMD is larger than the sum of the engine torque and the torque that is amplified by the torque converter 30 in accordance with the differential rotational speed between the pump impeller 32 and the turbine runner 33, to cause the torque converter 30 to amplify the torque such that a torque as large as the large demanded torque PMCMD is output to the drive wheels DW and DW, it is required to use a large-sized torque converter 30 large in the degree of torque amplification. According to the present embodiment, when the condition (b) is satisfied, by performing the assisted traveling as described above to thereby assist the engine power by the rotating machine 20, it is possible to increase the torque transmitted to the drive wheels DW and DW. This makes it possible to use a small-sized torque converter 30 small in the degree of torque amplification. This makes it possible to achieve reduction of the size and manufacturing costs of the power unit 1.

On the other hand, during the ENG travelling, when the remaining capacity SOC of the battery 52 is smaller than the predetermined value SOCREF, and at the same time the engine power is in excess of the demanded output, power generation is performed by the rotating machine 20 using the engine power and the battery 52 is charged with the generated electric power. Hereinafter, such charging of the battery 52 is referred to as "drive-time charging". During drive-time charging, the lockup clutch 35 is held in the disengaged state, and the electric power generated by the rotating machine 20 for charging the battery 52 is controlled to have the same magnitude as that of the engine power in excess of the demanded output.

Figure 17:
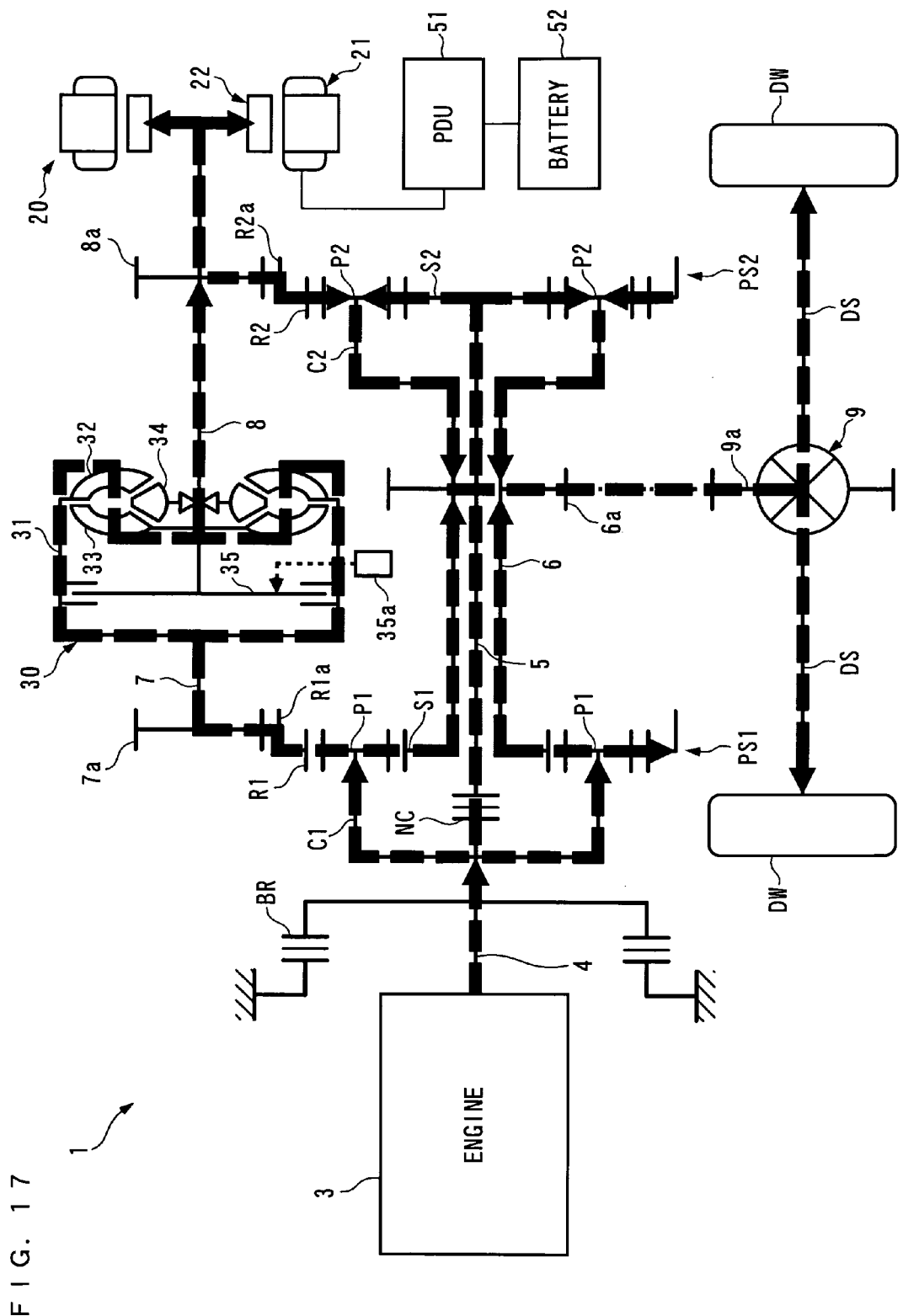
FIG. 17 is a view showing conditions of transmission of torques in the FIG. 1 power unit during drive-time charging.

Referring to FIG. 17, during drive-time charging, part of the torque transmitted to the turbine runner 33, i.e. part of the turbine torque TT is transmitted to the rotating machine 20, and the remainder of the turbine torque TT is transmitted to the second ring gear R2, and is combined with the torque transmitted to the second sun gear S2, whereafter the combined torque is transmitted to the second carrier C2. The torque transmitted to the second carrier C2 is combined with the engine torque distributed to the first sun gear S1, and then the combined torque is transmitted to the drive wheels DW and DW. As described above, during drive-time charging, the power transmitted to the drive wheels DW and DW becomes equal in magnitude to power which is obtained by subtracting electric power (energy) generated by the rotating machine 20 from the engine power if power transmission losses in the respective gears are ignored.

Figure 18:
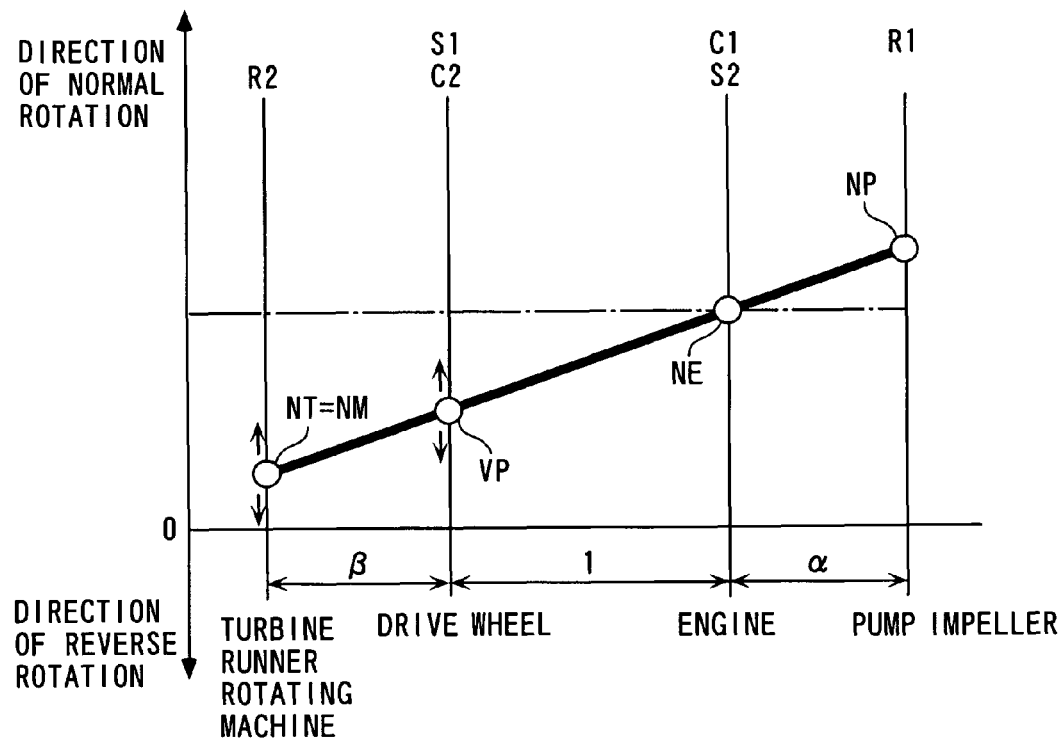
FIG. 18 is a diagram which is useful in explaining vehicle speed control carried out in the FIG. 1 power unit during assisted traveling and drive-time charging.
Figure 19:
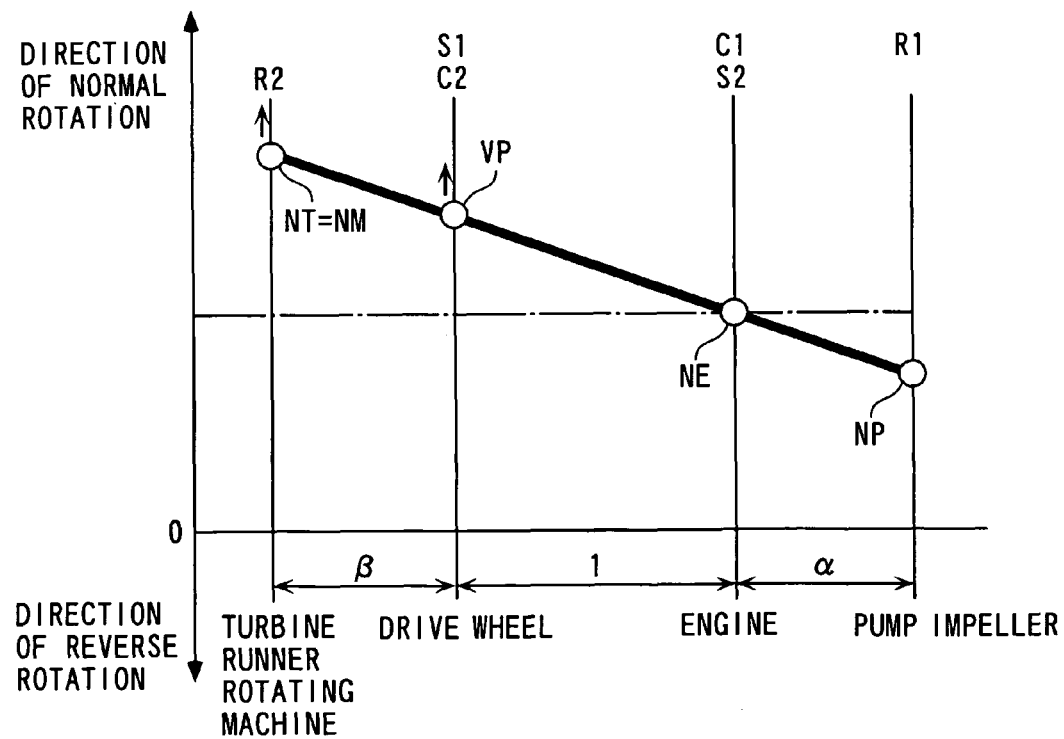
FIG. 19 is a diagram which is useful in explaining vehicle speed control carried out in the FIG. 1 power unit during assisted traveling.

Further, during the above-described assist traveling and drive-time charging, the vehicle speed VP can be steplessly controlled by controlling the rotating machine torque, the rotating machine speed NM, and the electric power for charging the battery 52. More specifically, as shown in FIG. 18, when the vehicle speed VP is lower than the engine speed NE, by performing drive-time charging to increase the electric power for charging the battery 52, and at the same time reduce the rotating machine speed NM to a rotational speed lower than the engine speed NE, it is possible to steplessly reduce the vehicle speed VP. Inversely, by assisting the engine power by the rotating machine 20 to increase the rotating machine torque and at the same time increase the rotating machine speed NM, it is possible to steplessly increase the vehicle speed VP. In this case, compared with the aforementioned control of the degree of decrease in the speed, which is performed using the lockup clutch 35, it is possible to control the vehicle speed VP rapidly in a fine-grained manner. Furthermore, by assisting the engine power using the rotating machine 20 to thereby increase the rotating machine torque, and at the same time, as shown in FIG. 19, increase the rotating machine speed NM to a rotational speed higher than the engine speed NE, it is possible to steplessly increase the vehicle speed VP to a rotational speed higher than the engine speed NE.

Next, a description will be given of an operation of the power unit 1, which is performed during deceleration traveling of the vehicle, i.e. when the vehicle is traveling by inertia in a state in which no power is output from the engine 3 or the rotating machine 20. During the deceleration traveling of the vehicle, the neutral clutch NC is engaged to thereby connect the crankshaft, the first carrier C1 and the second sun gear S2 to each other, and the electromagnetic brake BR is turned off to allow the crankshaft, the first carrier C1 and the second sun gear S2 to rotate. Further, the lockup clutch 35 is disengaged, and power generation is performed by the rotating machine 20 using power from the drive wheels DW and DW to charge the battery 52 with the generated electric power. Hereinafter, charging with electric power that is generated using the power from the drive wheels DW and DW, as described above, is referred to as "the first deceleration regeneration".

Figure 20:
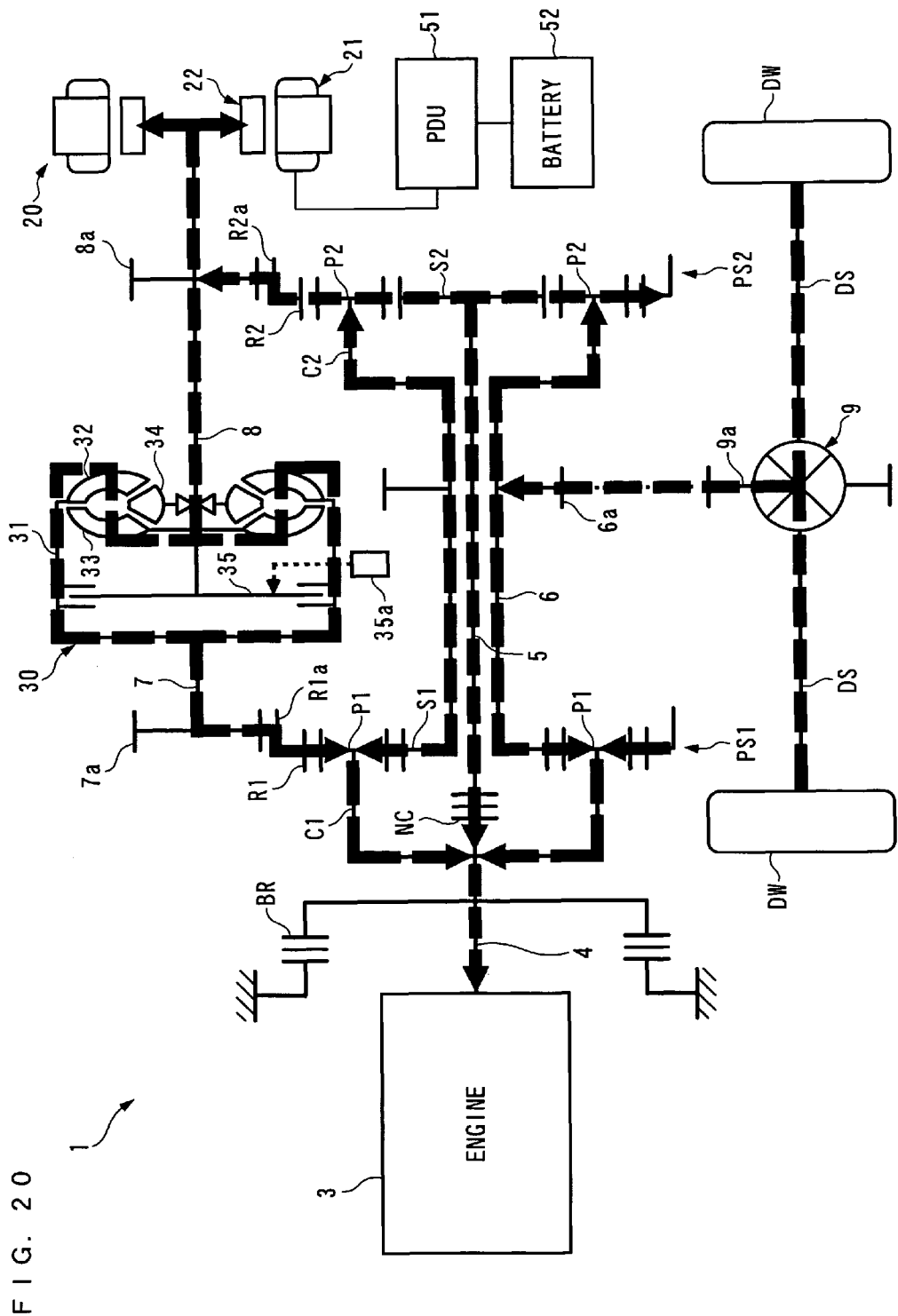
FIG. 20 is a view showing conditions of transmission of torques in the FIG. 1 power unit during first deceleration regeneration.

As described above, during first deceleration regeneration, e.g. as shown in FIG. 20, part of torque from the drive wheels DW and DW is transmitted to the second carrier C2, and the torque transmitted to the second carrier C2 is distributed to the second sun gear S2 and the second ring gear R2. Part of the torque distributed to the second ring gear R2 is transmitted to the rotating machine 20, and the remainder of the same is transmitted to the first ring gear R1 via the torque converter 30. Further, the remainder of the torque from the drive wheels DW and DW is transmitted to the first sun gear S1. The torque transmitted to the first sun gear S1 is combined with the torque transmitted to the first ring gear R1 as described above, and then is transmitted to the first carrier C1. Furthermore, the torques transmitted to the second sun gear S2 and the first carrier C1 as described above are combined at the first connection shaft 4, and then the combined torque is transmitted to the crankshaft.

As described hereinabove, during first deceleration regeneration, the power from the drive wheels DW and DW is transmitted to the rotating machine 20 without via the torque converter 30.

Further, the electric charging using the power from the drive wheels DW and DW may be performed as follows: The crankshaft, the first carrier C1 and the second sun gear S2 are held unrotatable by the engagement of the neutral clutch NC and the ON operation of the electromagnetic brake BR, and the lockup clutch 35 is disengaged. In this state, the electric charging using the rotating machine 20 is performed. Hereinafter, charging with electric power performed as described above is referred to as "second deceleration regeneration".

Figure 21:
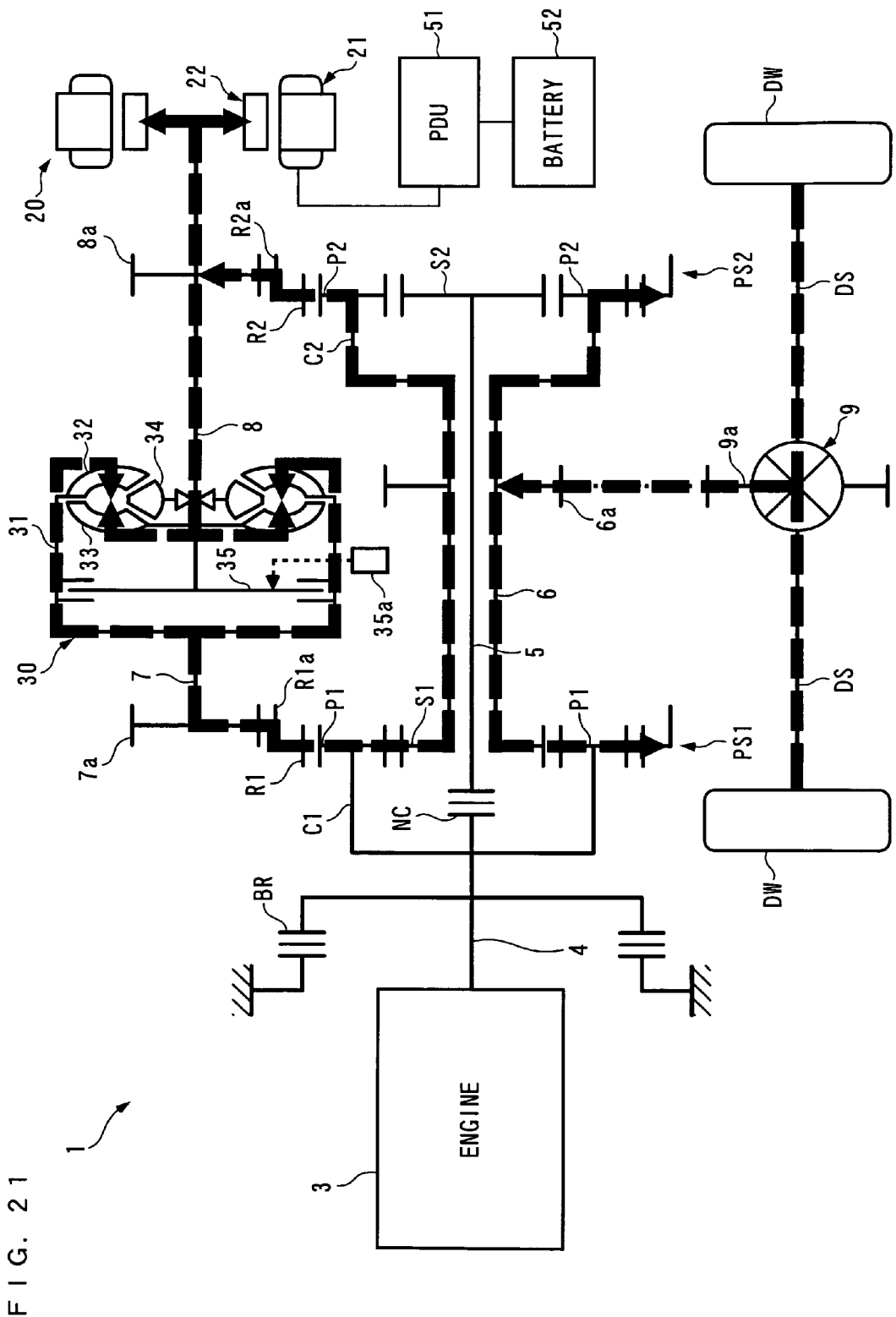
FIG. 21 is a view showing conditions of transmission of torques in the FIG. 1 power unit during second deceleration regeneration.

Thus, during second deceleration regeneration, as shown in FIG. 21, since the first carrier C1 is held unrotatable, part of the torque from the drive wheels DW and DW is transmitted to the pump impeller 32 via the first sun gear S1, the first planetary gears P1 and the first ring gear R1, causing the pump impeller 32 to perform the reverse rotation. Further, since the second sun gear S2 is held unrotatable, the remainder of the torque from the drive wheels DW and DW is transmitted to the second ring gear R2 via the second carrier C2 and the second planetary gears P2. Part of the torque transmitted to the second ring gear R2 is transmitted to the turbine runner 33, causing the turbine runner 33 to perform the normal rotation, and the remainder thereof is transmitted to the rotating machine 20.

As described above, during second deceleration regeneration, it is possible to perform the electric charging using the power from the drive wheels DW and DW without transmitting the power from the drive wheels DW and DW to the engine 3, thereby making it possible to charge the battery 52 with larger electric power.

As described hereinabove, according to the present embodiment, the use of the torque converter 30 makes it possible to transmit the power from the engine to the drive wheels DW and DW while steplessly reducing the speed of the engine power, without performing any complicated control of the rotating machine, as in the aforementioned conventional case which uses two pairs of rotating machines and control units. Further, for the same reason, it is possible to achieve reduction of the size and manufacturing costs of the power unit 1. Furthermore, during ENG traveling, the engine power is controlled such that excellent fuel economy can be obtained, and when the engine power becomes short with respect to an output demanded by the vehicle, the rotating machine 20 assists the engine power to compensate for the shortage, whereas when the engine power is in excess of the demanded output, the rotating machine 20 uses surplus power to generate electric power for charging the battery 52. This makes it possible to obtain excellent fuel economy of the engine while properly driving the drive wheels DW and DW.

Furthermore, as described above with reference to FIG. 13, by distributing and combining the powers in the first and second planetary gear units PS1 and PS2. It is possible to reduce the engine power passing through the torque converter 30, compared with the case where the engine 3 is directly connected to the torque converter 30. Therefore, compared with the case where the torque converter 30 is directly connected to the engine 3, it is possible to reduce transmission losses of the engine power in the torque converter 30, thereby making it possible to enhance driving efficiency of the drive wheels DW and DW. Further, as described above with reference to FIG. 16, during assisted traveling, the power from the rotating machine 20 is transmitted to the drive wheels DW and DW without via the torque converter 30. This makes it possible, during assisted traveling, to reduce transmission losses of the power from the rotating machine 20 in the torque converter 30, which makes it possible to enhance driving efficiency of the drive wheels DW and DW. Furthermore, for the same reason, it is possible to reduce the size of the torque converter 30, thereby making it possible to further reduce the size of the power unit 1.

Further, as described above with reference to FIG. 20, during first deceleration regeneration, the power from the drive wheels DW and DW is transmitted to the rotating machine 20 without via the torque converter 30, which makes it possible to avoid transmission losses of the power from the drive wheels in the torque converter 30, thereby making it possible to enhance the power generation efficiency of the rotating machine 20 in the case of using the power from the drive wheels DW and DW. Furthermore, since the EV traveling is performed which employs only the rotating machine 20 as a power source by using electric power charged in the battery 52 through execution of drive-time charging, first deceleration regeneration, and second deceleration regeneration, it is possible to further enhance the fuel economy of the engine.

Further, since the first and second planetary gear units PS1 and PS2 of a general type are used, it is possible to construct the power unit 1 easily and inexpensively without using a special mechanism. Furthermore, for the same reason, it is possible to further reduce the size of the power unit 1. Further, since the torque converter 30 is connected to the first and second ring gears R1 and R2, it is possible to connect the torque converter 30 and assemble the power unit 1 easily. Further, it is possible to control the degree of decrease in the speed of the power which is transmitted from the engine 3 to the drive wheels DW and DW, by controlling the degree of engagement of the lockup clutch 35. Therefore, the control can be very much simplified compared with the above-described conventional case.

Figure 22:
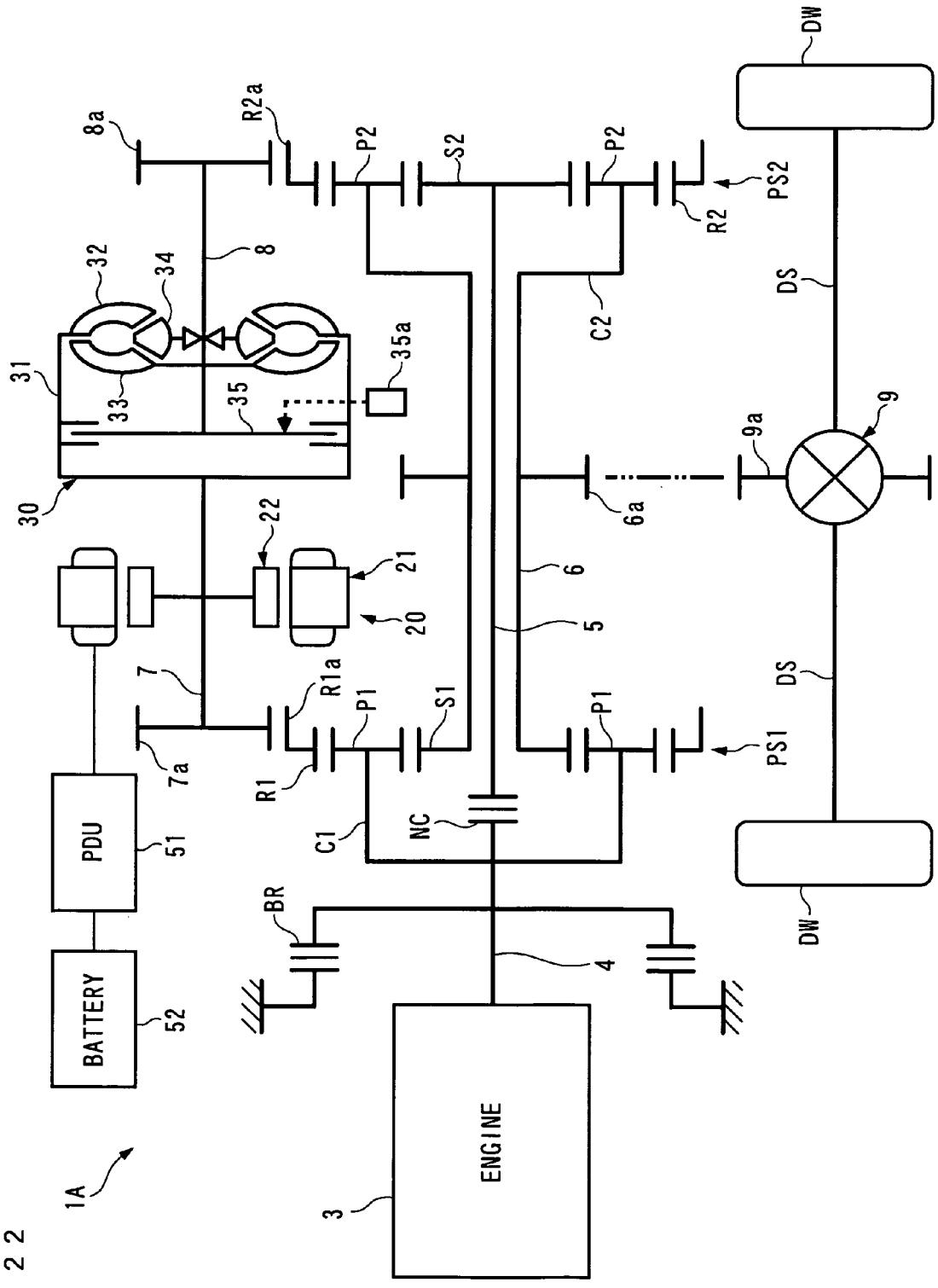
FIG. 22 is a schematic diagram of a drive system for a vehicle, to which is applied a power unit according to a second embodiment of the present invention.

Next, a power unit 1A according to a second embodiment of the present invention will be described. Referring to FIG. 22, the power unit 1A is distinguished from the above-mentioned power unit 1 according to the first embodiment only in that the rotor 22 of the rotating machine 20 is integrally formed not with the output shaft 8 but with the input shaft 7. Due to this difference from the first embodiment, out of operations of the power unit 1A, mainly those in which the rotating machine 20 is involved, i.e. operations of the power unit 1A during EV traveling, the ENG start during stoppage of the vehicle, the assisted traveling, drive-time charging, the first deceleration regeneration, and second deceleration regeneration are different from the operations of the power unit 1 according to the first embodiment. Hereinafter, a description will be mainly given of the different points. It should be noted that in the present embodiment, the start of the engine 3 during EV traveling is not executed.

First, a description will be given of the operation of the power unit 1A during EV traveling. During EV traveling, the neutral clutch NC, the electromagnetic brake BR and the lockup clutch 35 are controlled similarly to the first embodiment, and electric power is supplied to the rotating machine 20. Further, differently from the first embodiment, the rotating machine 20 is caused to perform the reverse rotation instead of being caused to perform the normal rotation.

Figure 23:
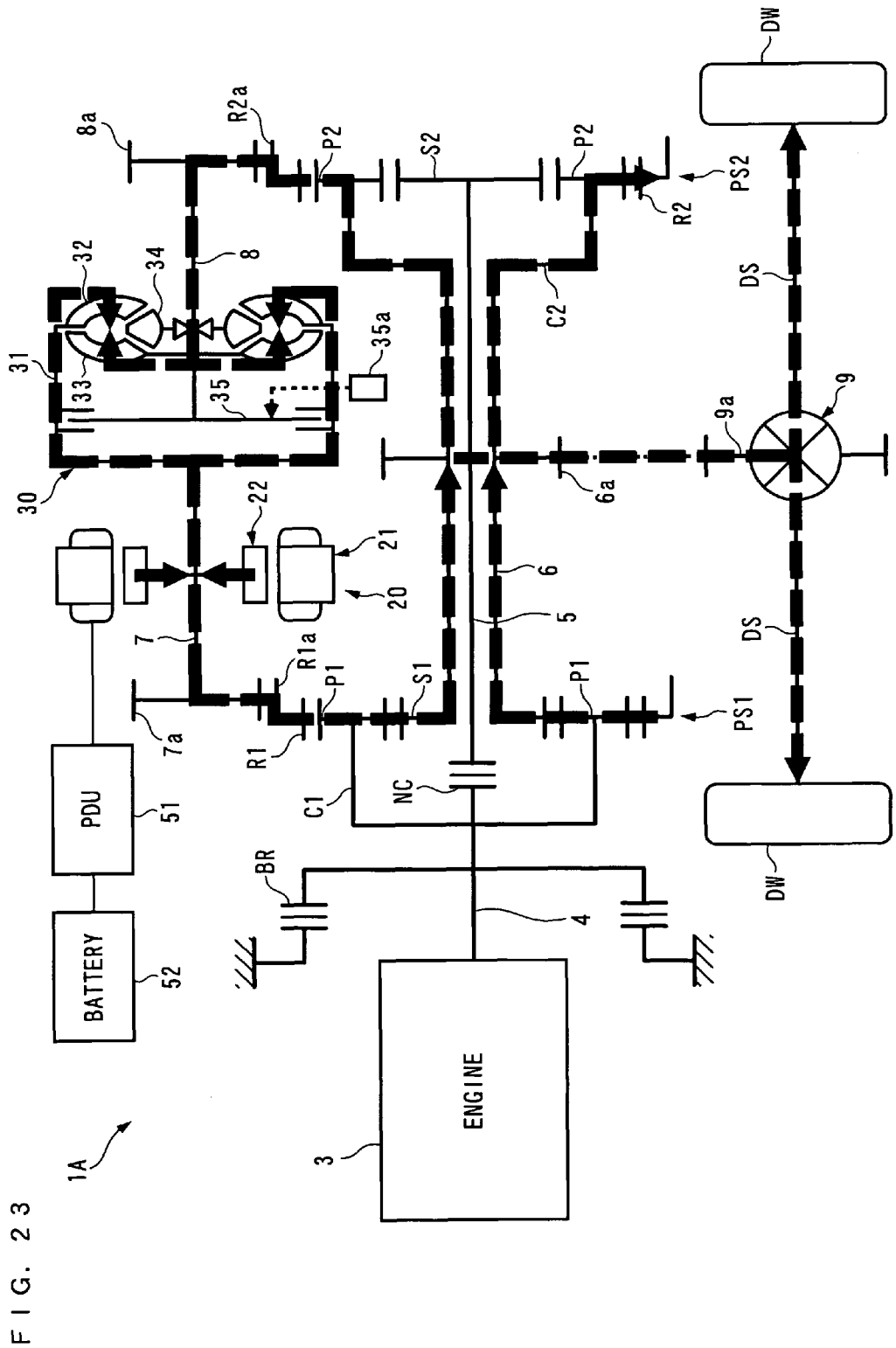
FIG. 23 is a view showing conditions of transmission of torques in the FIG. 22 power unit during EV traveling.

As a result, during EV traveling, as shown in FIG. 23, part of the rotating machine torque is transmitted to the pump impeller 32 to cause the pump impeller 32 to perform the reverse rotation. Further, since the first carrier C1 is held unrotatable as described above, the remainder of the rotating machine torque is transmitted to the first sun gear S1 via the first ring gear R1 and the first planetary gears P1 to cause the first sun gear S1 to perform the normal rotation. Further, since the second sun gear S2 is held unrotatable, part of the torque transmitted to the first sun gear S1 is transmitted to the turbine runner 33 via the second carrier C2, the second planetary gears P2 and the second ring gear R2. Furthermore, the remainder of the torque transmitted to the first sun gear S1 is transmitted to the drive wheels DW and DW to cause the drive wheels DW and DW to perform the normal rotation.

Figure 24:
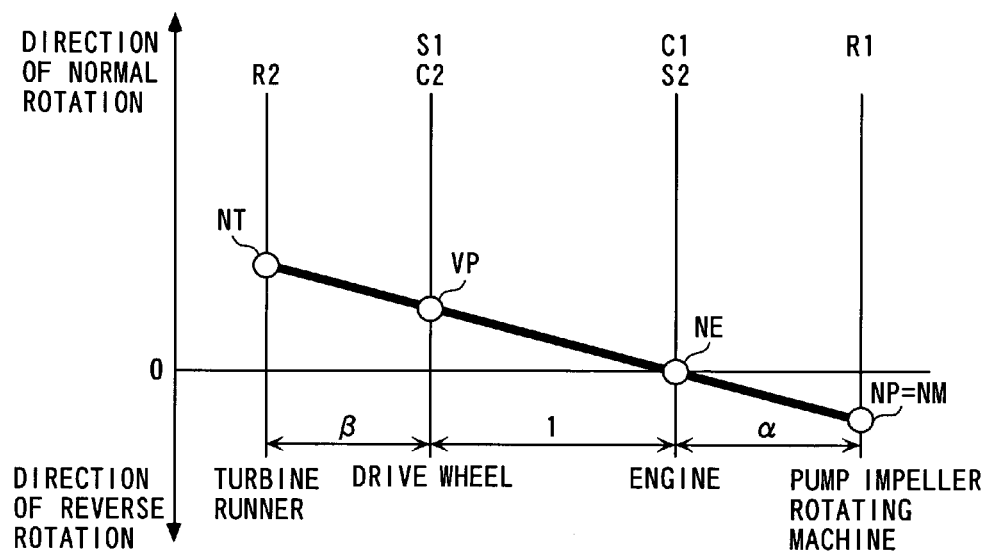
FIG. 24 is a view showing a collinear chart illustrating an example of the relationship between a pump speed, an engine speed, a vehicle speed, a turbine speed and a rotating machine speed of the FIG. 22 power unit during EV traveling.

As a result, similarly to the first embodiment, as shown in FIG. 24, in a state in which the engine 3 is at a stop (NE=0), the vehicle speed VP is made higher, and the vehicle travels. As described above, similarly to the first embodiment, the power from the rotating machine 20 is transmitted to the drive wheels DW and DW without via the torque converter 30. It should be noted that in this case, the EV traveling can be performed without any difficulty though the pump impeller 32 and the turbine runner 33 rotate in the opposite directions, similarly to the first embodiment, as shown in FIG. 25.

Next, a description will be given of the operation of the power unit 1A at the time of the ENG start during stoppage of the vehicle. At the time of the ENG start during stoppage of the vehicle, the neutral clutch NC, the electromagnetic brake BR, and the lockup clutch 35 are controlled similarly to the first embodiment, and electric power is supplied to the rotating machine 20. At the same time, differently from the first embodiment, the rotating machine 20 is caused to perform the normal rotation instead of being caused to perform the reverse rotation.

As described hereinabove, during stoppage of the vehicle, the first sun gear S1 and the second carrier C2 are held unrotatable by the brakes associated with the drive wheels DW and DW. Therefore, part of the rotating machine torque is transmitted to the first carrier C1 via the first ring gear R1 and the first planetary gears P1, and the remainder of the same is transmitted to the pump impeller 32. Further, part of the torque transmitted to the first carrier C1 is transmitted to the turbine runner 33 via the second sun gear S2, the second planetary gears P2 and the second ring gear R2 to cause the second ring gear R2 and the turbine runner 33 to perform the reverse rotation. Furthermore, the remainder of the torque transmitted to the first carrier C1 is transmitted to the engine 3 to cause the crankshaft to perform the normal rotation.

Figure 25:
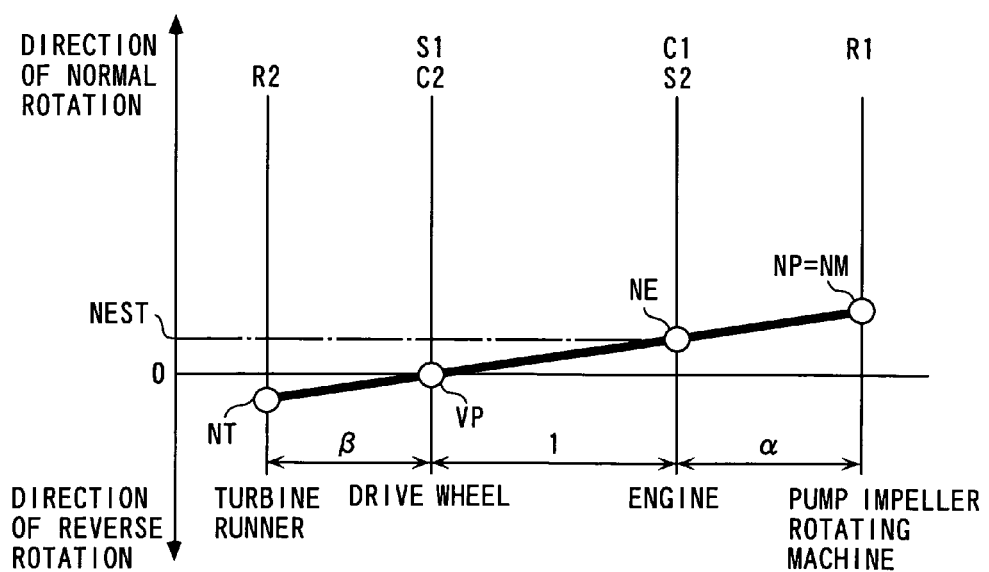
FIG. 25 is a view showing a collinear chart illustrating an example of the relationship between the pump speed, the engine speed, the vehicle speed, the turbine speed and the rotating machine speed of the FIG. 22 power unit at the time of the ENG start time during stoppage of the vehicle.

As a result, similarly to the first embodiment, at the time of the ENG start during stoppage of the vehicle, as shown in FIG. 25, the engine speed NE is increased in the state in which the vehicle is at a stop (VP=0). In this state, similarly to the first embodiment, the engine 3 is started by controlling the fuel injection valves and ignition operations by the respective spark plugs. In this case, the rotating machine speed NM and the rotating machine torque are controlled similarly to the first embodiment. Further, at the time of the ENG start during stoppage of the vehicle, if power transmission losses in the respective gears are ignored, the torque transmitted to the engine 3 becomes equal to a value obtained by multiplying the rotating machine torque by $(1+\alpha)$ ($\alpha$: the ratio between the number of the gear teeth of the first sun gear S1 and that of the gear teeth of the first ring gear R1).

In contrast, in the first embodiment, as described heretofore, at the time of the ENG start during stoppage of the vehicle, the torque transmitted to the engine 3 becomes equal to the value obtained by multiplying the rotating machine torque by $\alpha$. As is clear from this fact, according to the second embodiment, it is possible to transmit a torque larger than the torque in the first embodiment to the engine 3 with respect to the same magnitude of the rotating machine torque. Therefore, it is possible to reduce the rotating machine torque required for starting the engine 3. This makes it possible to reduce the size of the rotating machine 20, thereby making it possible to achieve further reduction of the size of the power unit 1A and reduction of manufacturing costs of the same.

It should be noted that at the time of the ENG start during stoppage of the vehicle, as shown in FIG. 25, the engine 3 can be started without any difficulty though the pump impeller 32 and the turbine runner 33 rotate in the opposite directions similarly to the first embodiment.

Next, a description will be given of the operations of the power unit 1A during assisted traveling, drive-time charging, and the decelerated traveling. During assisted traveling, drive-time charging, and the decelerated traveling, the rotating machine 20, the neutral clutch NC, the electromagnetic brake BR, and the lockup clutch 35 are controlled similarly to the first embodiment. However, since conditions of transmission of torques, and a method of controlling the vehicle speed VP during assisted traveling and drive-time charging are different from those in the first embodiment, hereinafter, a description will be mainly given of the different points.

Figure 26:
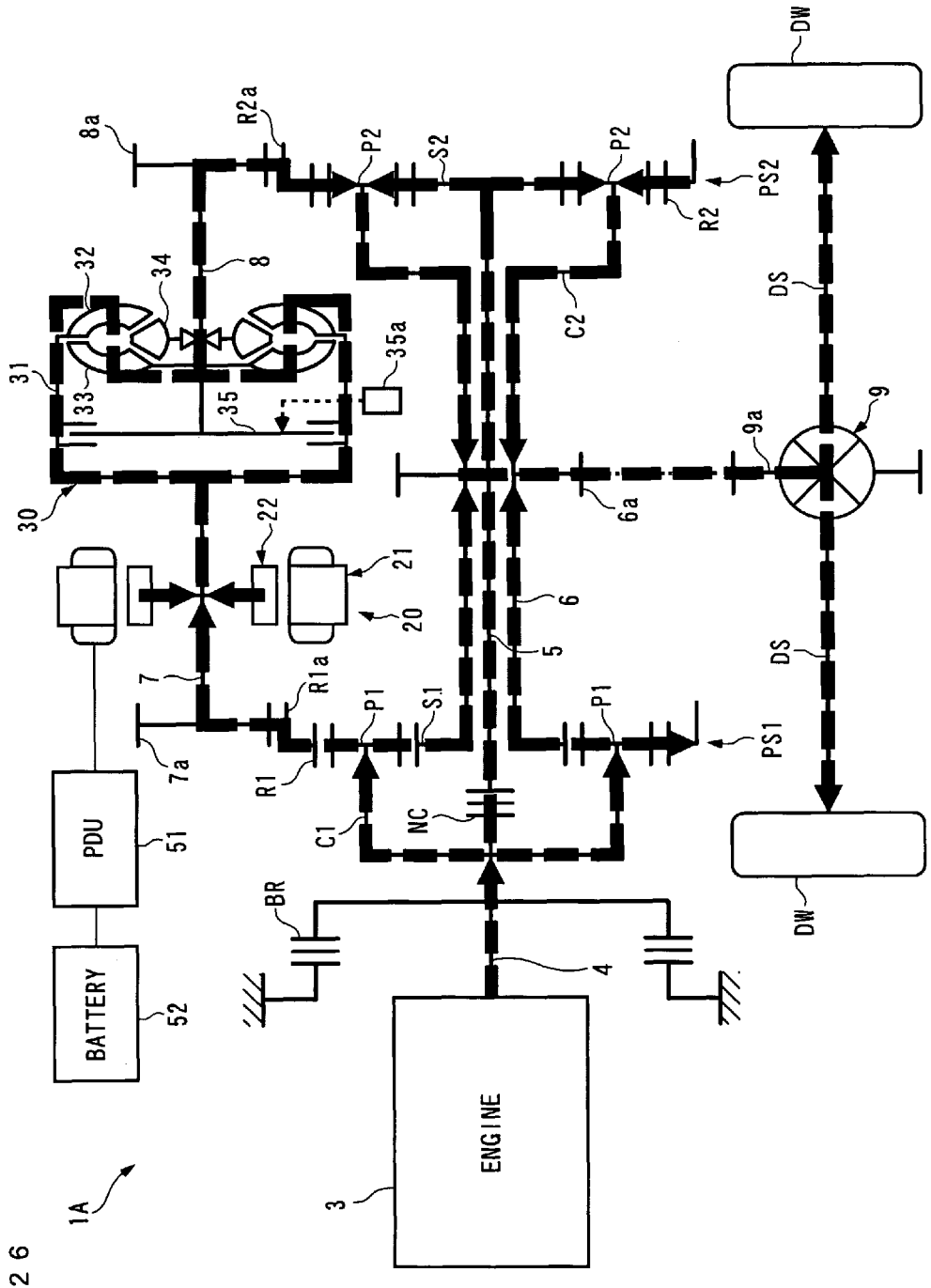
FIG. 26 is a view showing conditions of transmission of torques in the FIG. 22 power unit during assisted traveling.

During assisted traveling, as shown in FIG. 26, the rotating machine torque is combined with the engine torque distributed to the first ring gear R1 as described above, and the combined torque is transmitted to the second ring gear R2 via the torque converter 30. The other torques are transmitted similarly to the first embodiment. It should be noted that in the second embodiment, the rotating machine torque is transmitted to the drive wheels DW and DW via the torque converter 30, and hence it is impossible to obtain the effects of reducing power transmission loss at the torque converter 30 and reducing the degree of torque amplification required of the torque converter 30, as in the first embodiment.

Figure 27:
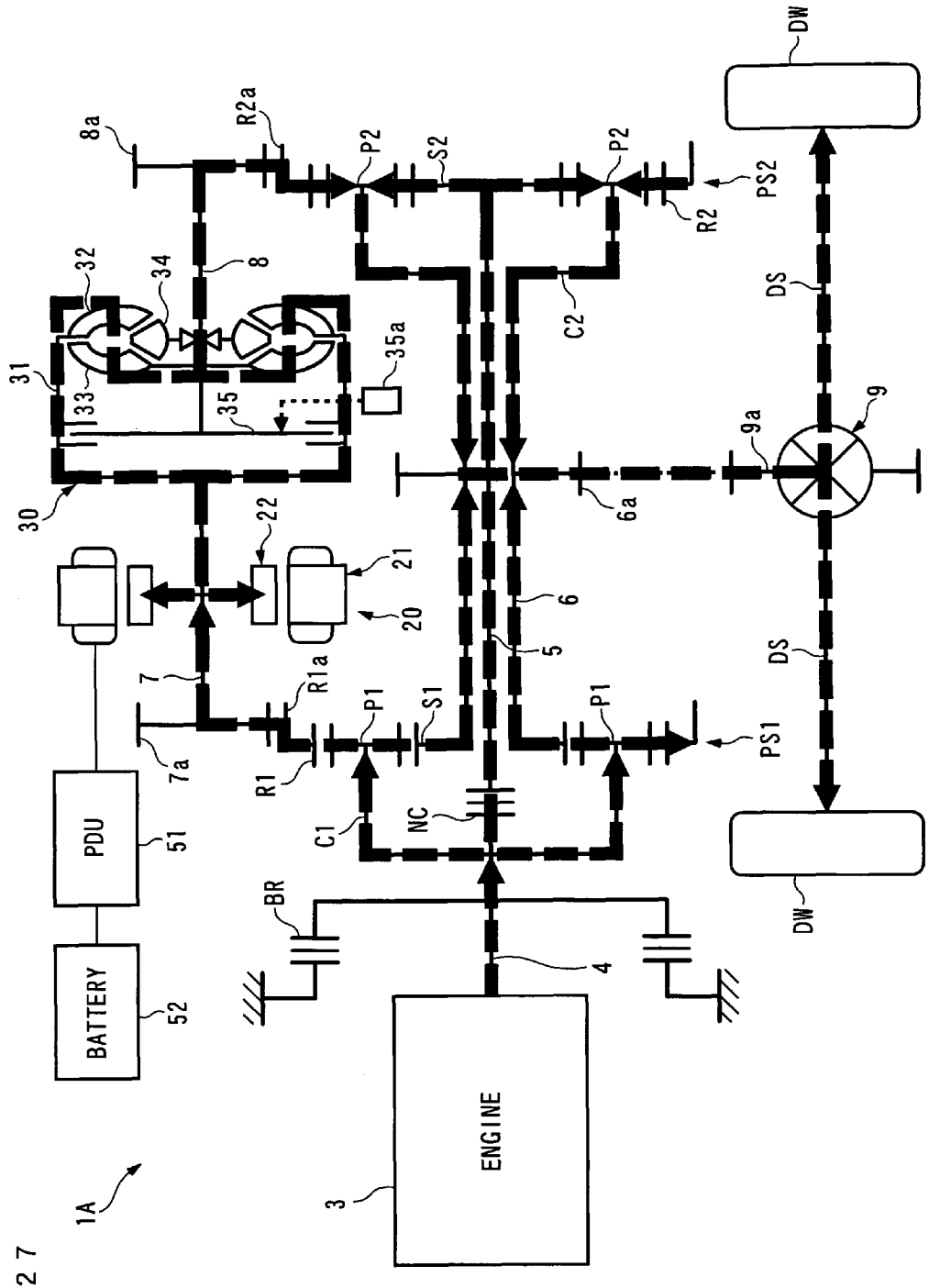
FIG. 27 is a view showing conditions of transmission of torques in the FIG. 22 power unit during drive-time charging.

Further, during drive-time charging, as shown in FIG. 27, part of the engine torque distributed to the first ring gear R1 as described above is transmitted to the rotating machine 20, and the remainder of the same is transmitted to the second ring gear R2 via the torque converter 30. The other torques are transmitted similarly to the first embodiment. Furthermore, in this case, as described hereinabove, differently from the first embodiment, the engine power is transmitted to the rotating machine 20 without via the torque converter 30, so that it is possible to avoid power transmission losses in the torque converter 30, thereby making it possible to enhance the power generation efficiency of the rotating machine 20 using the engine power.

Figure 28:
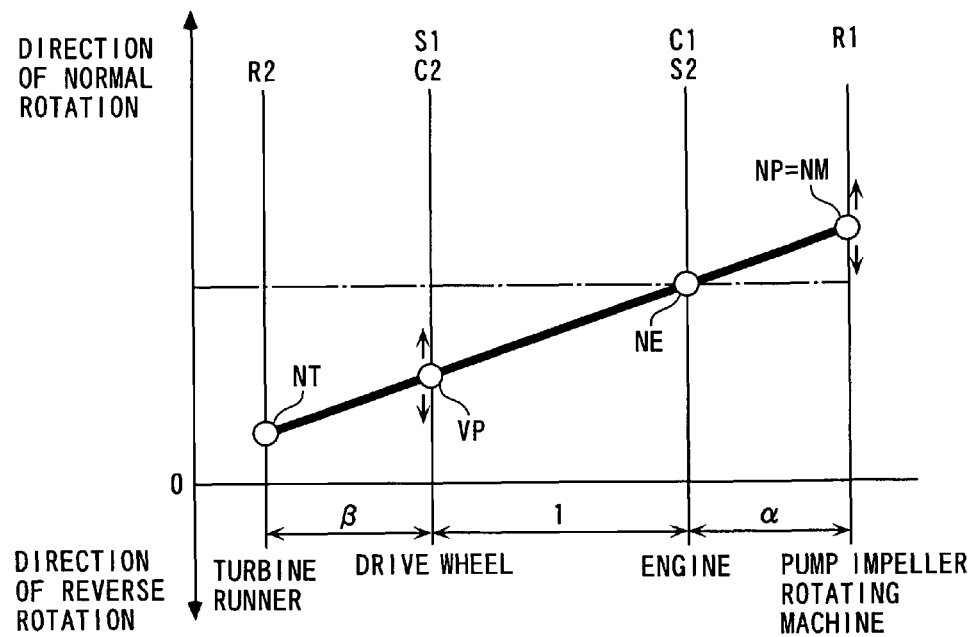
FIG. 28 is a diagram which is useful in explaining vehicle speed control carried out in the FIG. 22 power unit during assisted traveling and drive-time charging.
Figure 29:
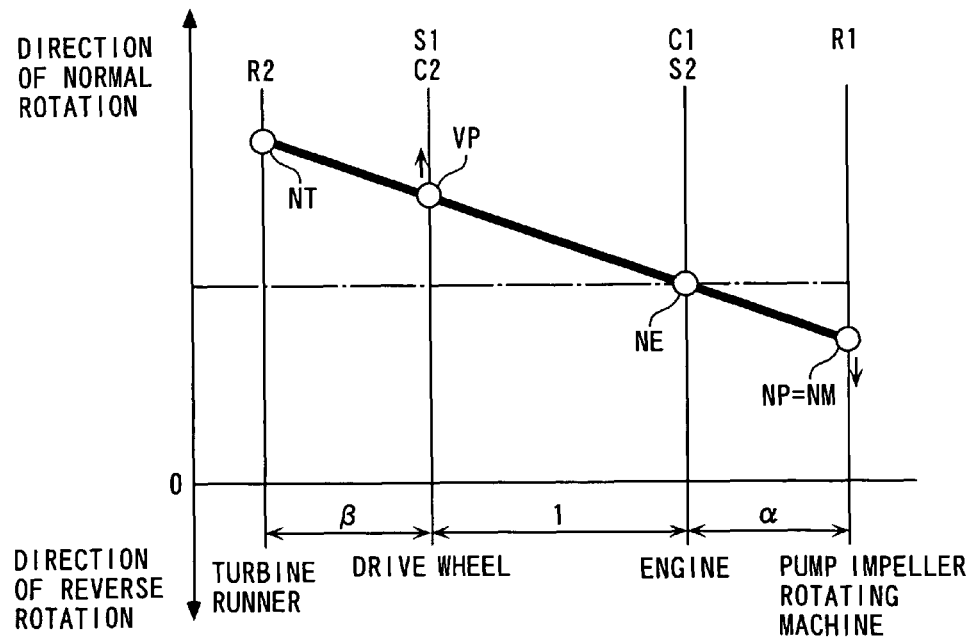
FIG. 29 is a diagram which is useful in explaining vehicle speed control carried out in the FIG. 22 power unit during assisted traveling.

Further, in the second embodiment, during assisted traveling and drive-time charging, the vehicle speed VP can be controlled, similarly to the first embodiment, by controlling the rotating machine torque, the rotating machine speed NM and electric power generated by the rotating machine 20 for charging the battery 52, as follows: As shown in FIG. 28, when the vehicle speed VP is lower than the engine speed NE, drive-time charging is performed, and the rotating machine speed NM is increased to a rotational speed higher than the engine speed NE by reducing torque for use in charging the battery 52. This makes it possible to steplessly lower the ratio of rotation of the drive wheels DW and DW to rotation of the engine 3. Inversely, by increasing the rotating machine torque through assistance of the engine power using the rotating machine 20 to, the rotating machine speed NM is reduced, whereby it is possible to steplessly increase the ratio of rotation of the drive wheels DW and DW to rotation of the engine 3. In this case, compared with the aforementioned control of the degree of decrease in the speed, which is performed using the lockup clutch 35, it is possible to control the vehicle speed VP rapidly in a fine-grained manner. Furthermore, by increasing the rotating machine torque through assistance of the engine power using the rotating machine 20 to, and as shown in FIG. 29, causing the rotating machine speed NM to be reduced to a rotational speed lower than the engine speed NE, it is possible to steplessly increase the vehicle speed VP to a rotational speed higher than the engine speed NE.

Figure 30:
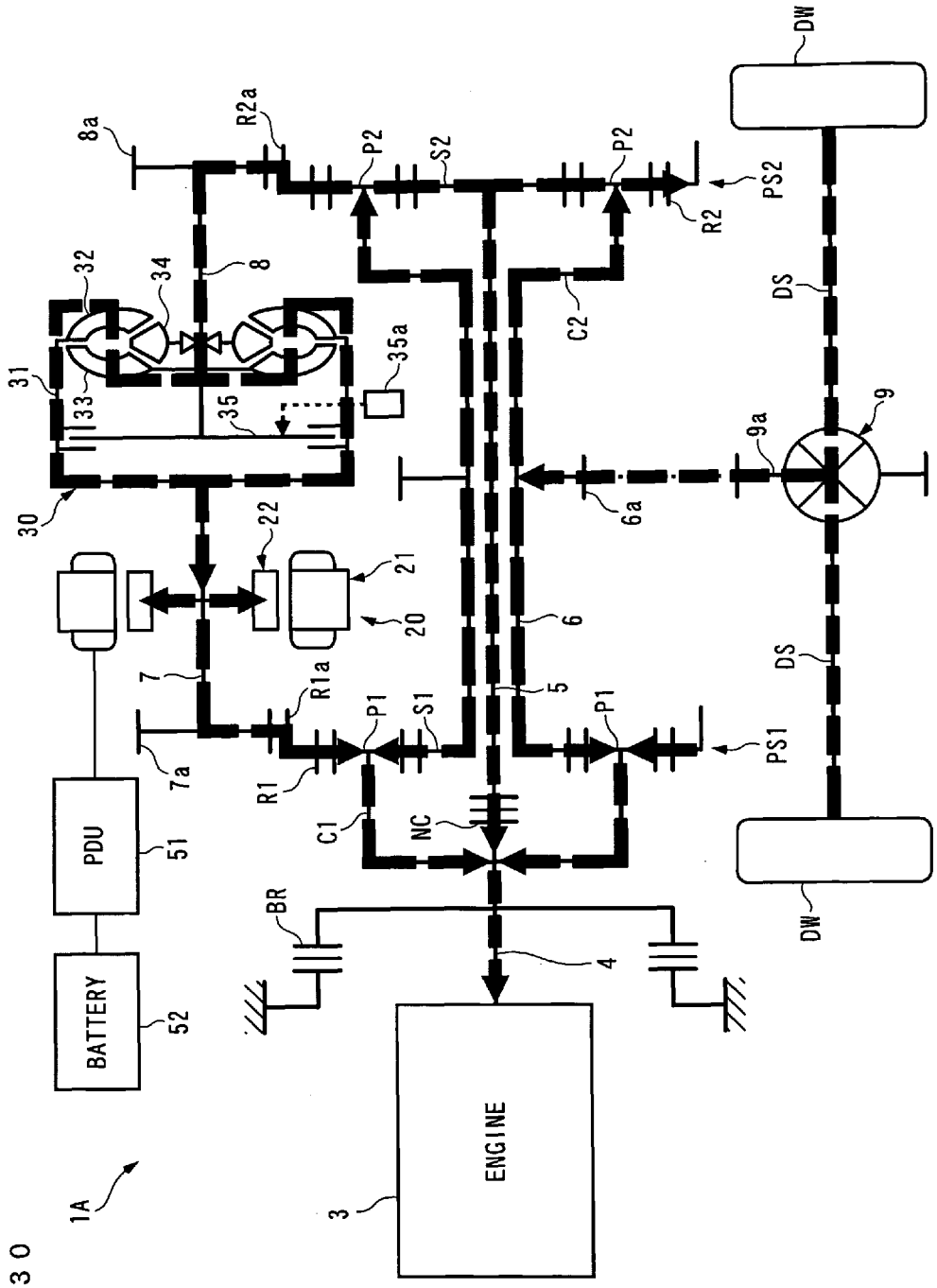
FIG. 30 is a view showing conditions of transmission of torques in the FIG. 22 power unit during first deceleration regeneration.

Further, during first deceleration regeneration, e.g. as shown in FIG. 30, part of the torque distributed to the second ring gear R2 as described above is transmitted to the rotating machine 20 via the torque converter 30. The other torques are transmitted similarly to the first embodiment. It should be noted that in the second embodiment, during first deceleration regeneration, the power from the drive wheels DW and DW is transmitted to the rotating machine 20 via the torque converter 30 as described above, so that it is impossible to obtain the effects of enhancing the power generation efficiency, as obtained in the first embodiment, in using the power from the drive wheels DW and DW.

Figure 31:
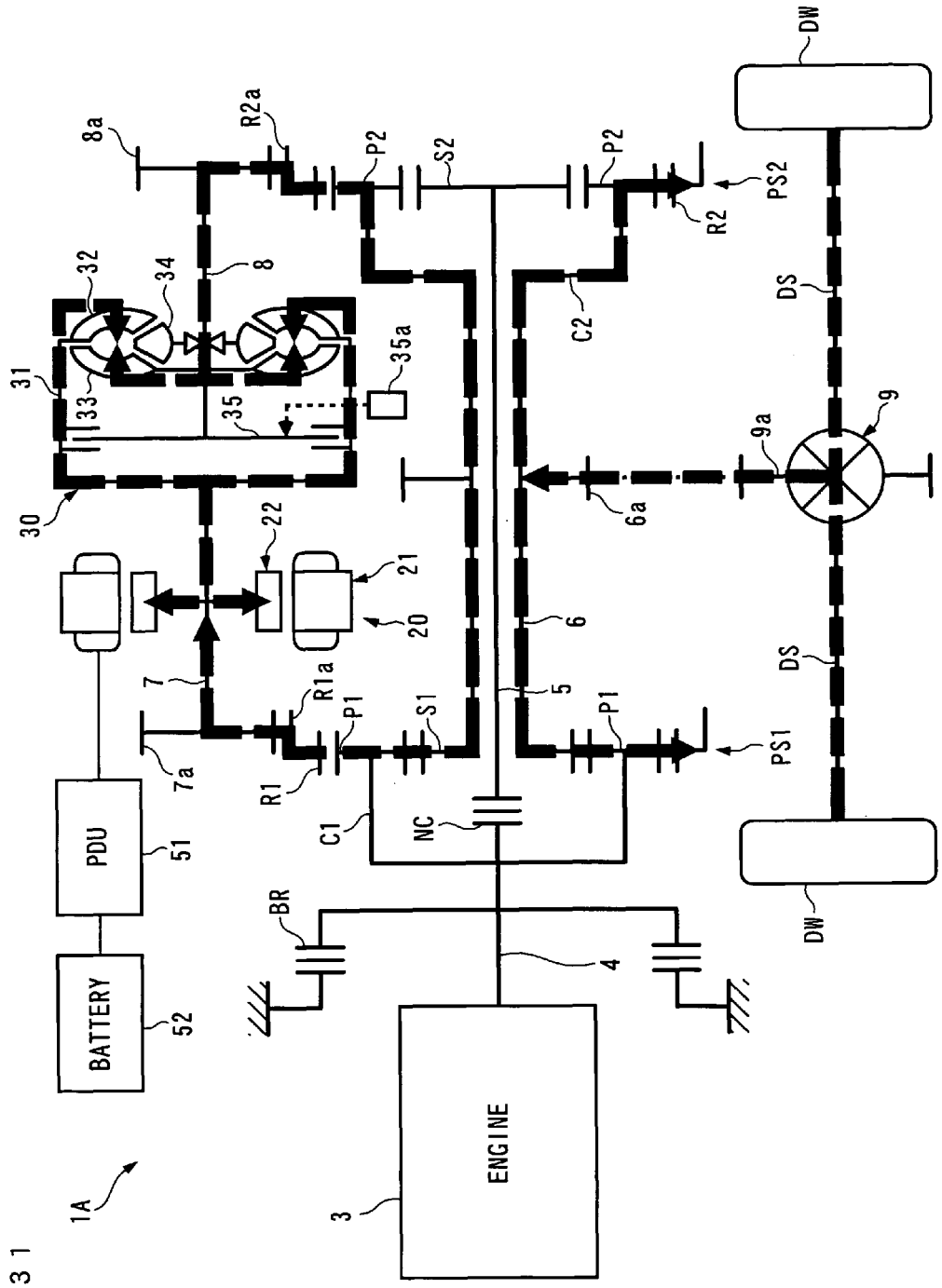
FIG. 31 is a view showing conditions of transmission of torques in the FIG. 22 power unit during second deceleration regeneration.
Figure 32:
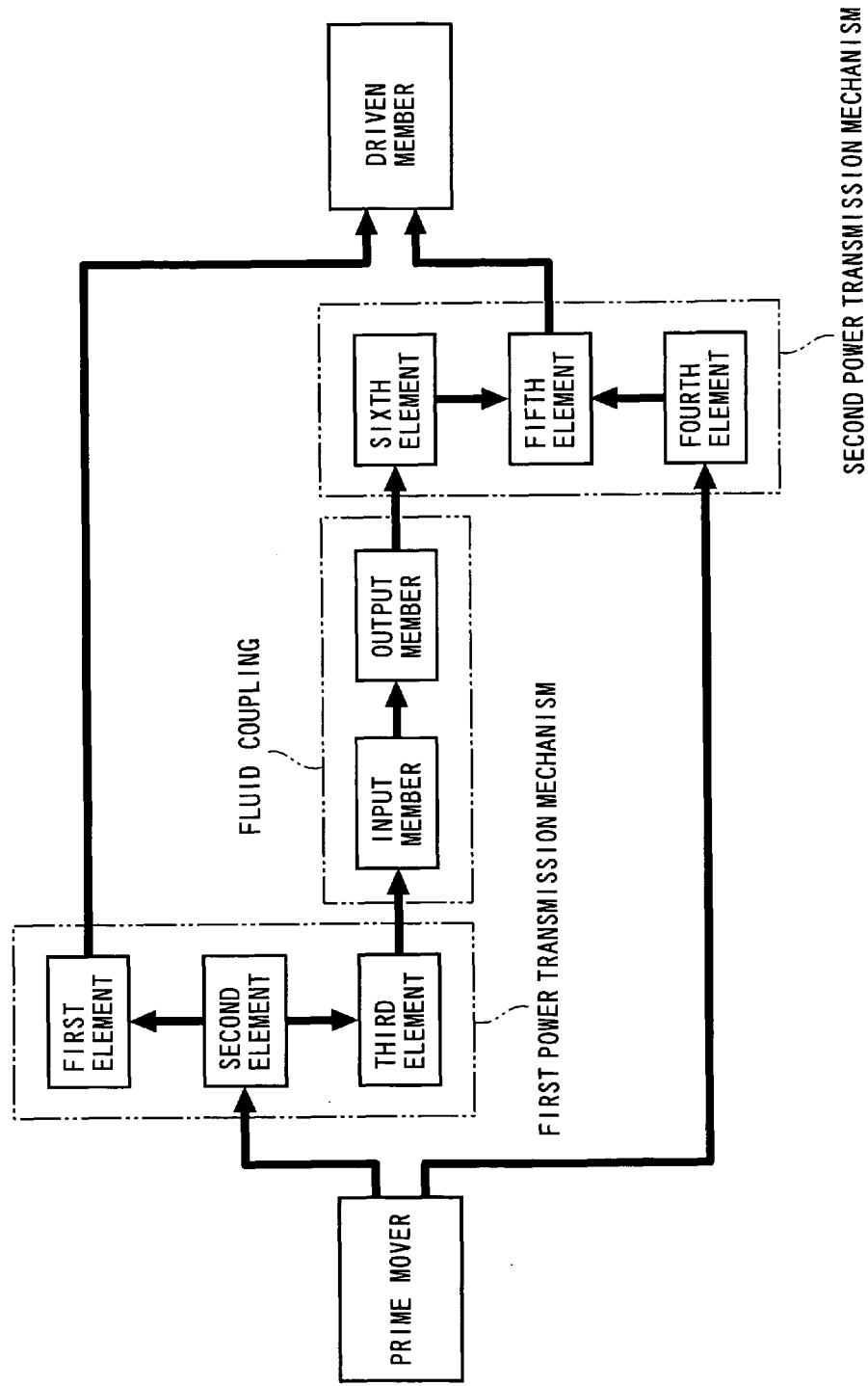
FIG. 32 is a diagram which is useful in explaining transmission of power from a prime mover to a driven member of the power unit according to the present invention.
Figure 33A:
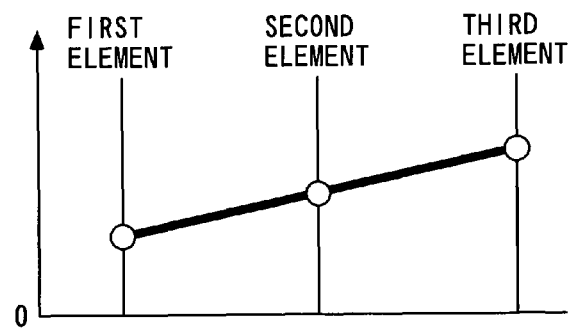
FIG. 33A is a view showing a collinear chart illustrating an example of the relationship between the respective rotational speeds of first to third elements, together with a collinear chart illustrating an example of the relationship between the respective rotational speeds of fourth to sixth elements.
Figure 33A:
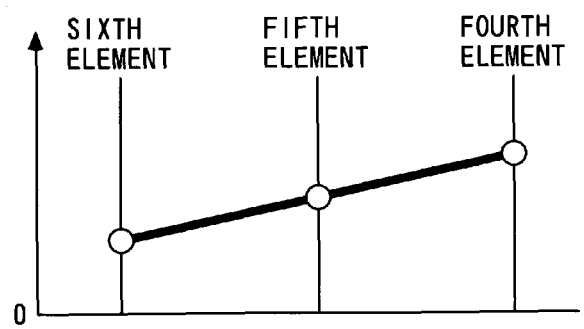
Figure 33B:
FIG. 33B is a view showing a collinear chart illustrating an example of the relationship between the respective rotational speeds of the first to sixth elements, the rotational speed of the input member, the rotational speed of the prime mover, the rotational speed of the driven member, and the rotational speed of the output member.
Figure 33B:
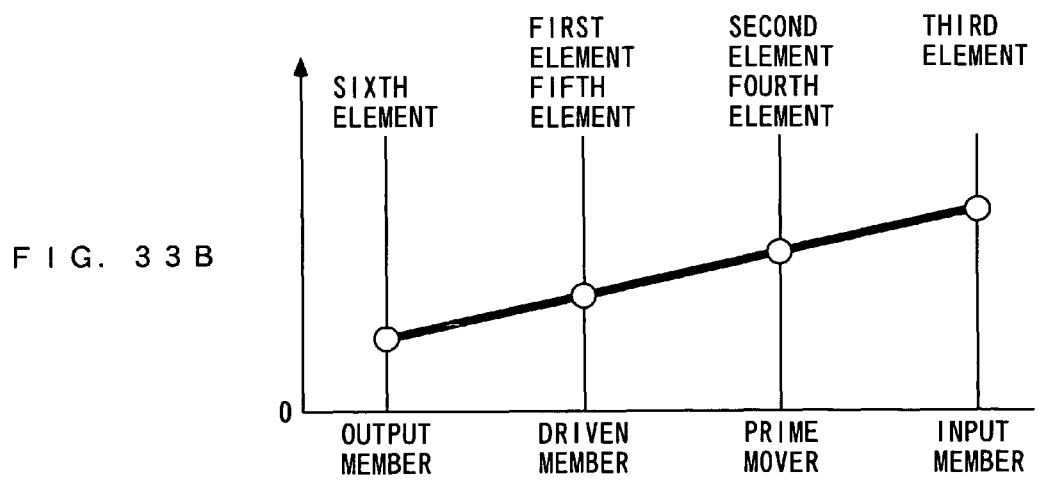
Figure 34:
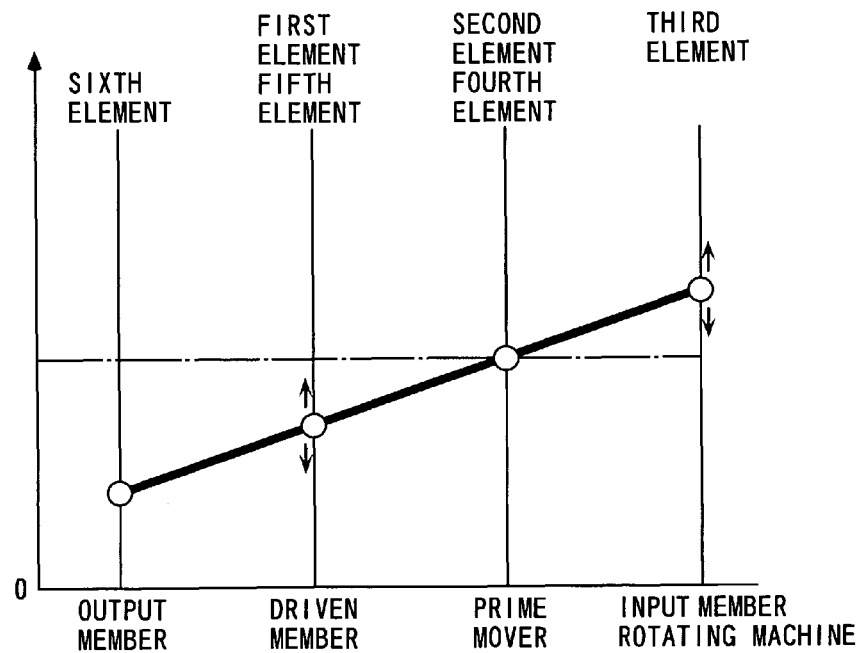
FIG. 34 is a diagram which is useful in explaining rotational speed control of the driven member carried out along with execution of rotating machine assistance and drive-time charging in a first connection pattern.
Figure 35:
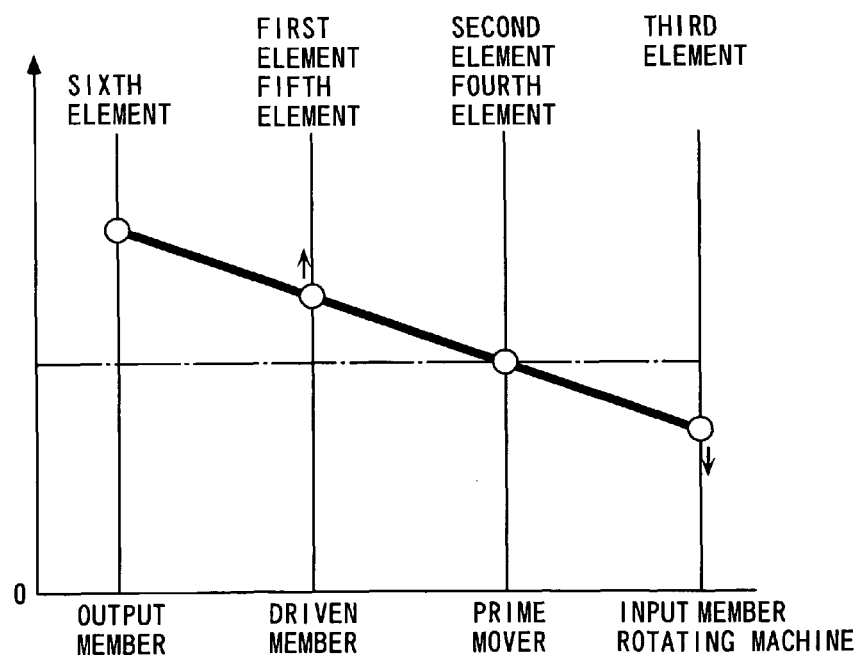
FIG. 35 is a diagram which is useful in explaining rotational speed control of the driven member carried out along with execution of rotating machine assistance in the first connection pattern.
Figure 36:
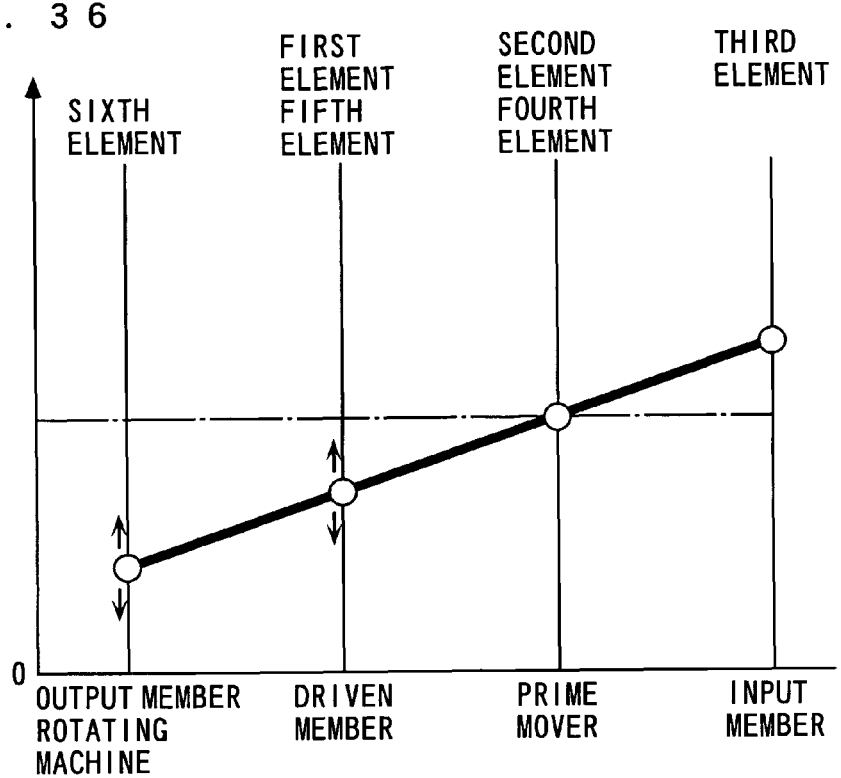
FIG. 36 is a diagram which is useful in explaining rotational speed control of the driven member carried out along with execution of rotating machine assistance and drive-time charging in a second connection pattern.
Figure 37:
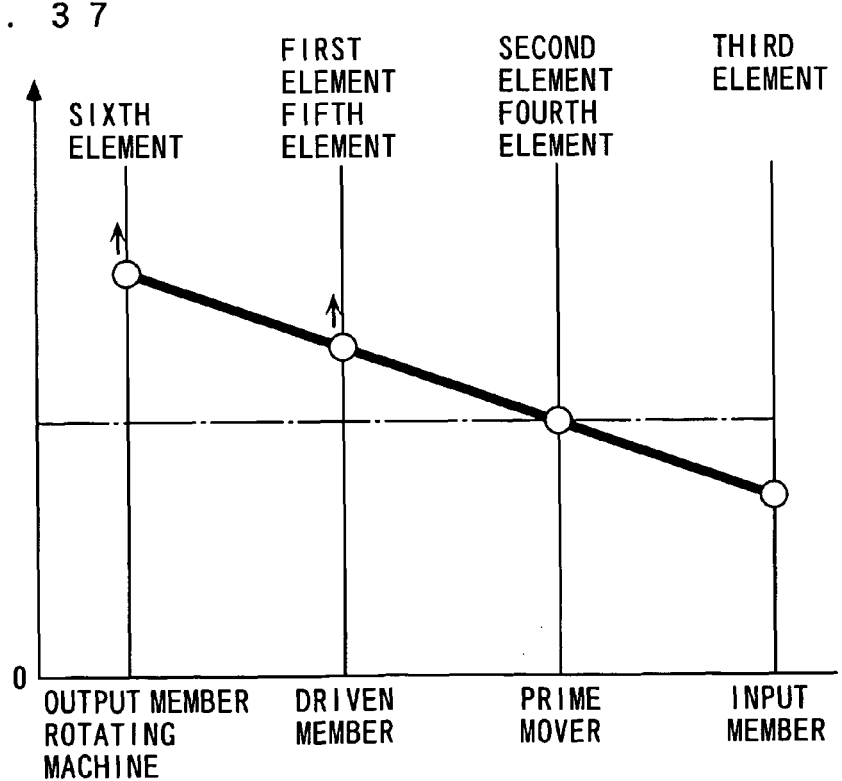
FIG. 37 is a diagram which is useful in explaining rotational speed control of the driven member carried out along with execution of rotating machine assistance in the second connection pattern.

Further, during second deceleration regeneration, as shown in FIG. 31, part of the torque transmitted to the first ring gear R1 as described above is transmitted to the rotating machine 20. The other torques are transmitted similarly to the first embodiment. As described above, similarly to the first embodiment, it is possible to perform power generation by using the drive wheels DW and DW without transmitting the power from the drive wheels DW and DW to the engine 3, which makes it possible to charge the battery 52 with larger electric power.

As described heretofore, according to the second embodiment, it is possible to obtain substantially the same advantageous effects as provided by the above-described first embodiment.

It should be noted that the present invention is by no means limited to the embodiments described above, but it can be practiced in various forms. For example, although in the above-described embodiments, the first and second planetary gear units PS1 and PS2 are used as the first and second power transmission mechanisms of the present invention, devices may be used each of which has capabilities equivalent to those of a planetary gear unit, and e.g. includes a plurality of rollers for transmitting power by frictions between surfaces of the rollers, in place of gears of the planetary gear units. Further, although in the above-described embodiments, the first carrier C1 and the second sun gear S2 are connected to each other, and the first sun gear S1 and the second carrier C2 are connected to each other, the first carrier C1 and the second sun gear S2 may not be connected to each other insofar as they are connected to the engine 3. Further, the first sun gear S1 and the second carrier C2 may not be connected to each other insofar as they are connected to the drive wheels DW and DW.

Furthermore, the connecting relationship between the engine 3, the drive wheels DW and DW, the pump impeller 32, the turbine runner 33, and the three elements of each of the first and second planetary gear units PS1 and PS2 may be set as desired insofar as it satisfies the following conditions: One of the second sun gear S2 and the second ring gear R2, and the first carrier C1 are connected to the engine 3; one of the first sun gear S1 and the first ring gear R1, and the second carrier C2 are connected to the drive wheels DW and DW; the other of the first sun gear S1 and the first ring gear R1 is connected to the pump impeller 32; the other of the second sun gear S2 and the second ring gear R2 is connected to the turbine runner 33. For example, the power unit may be configured such that the first carrier C1 and the second ring gear R2 are connected to the engine 3; the first ring gear R1 and the second carrier C2 are connected to the drive wheels DW and DW; and the first and second sun gears S1 and S2 are connected to the pump impeller 32 and the turbine runner 33, respectively.

Further, although in the above-described embodiments, the engine 3, i.e. a gasoline engine is used as a prime mover, this is not limitative, but a diesel engine and an external combustion engine may be used, for example. Further, although in the above-described embodiments, a brushless DC motor is used as the rotating machine 20, this is not limitative, but any other suitable rotating machine, such as an AC motor, may be used. Further, although in the above-described embodiments, the torque converter 30 is used as a fluid coupling in the present invention, this is not limitative, but a fluid clutch may be used. Furthermore, although in the above-described embodiments, the battery 52 is used as an electric power storage device in the present invention, this is not limitative, but a capacitor may be used.

Further, although in the above-described embodiments, the ECU 2 and the PDU 51 are used as control units in the present invention, this is not limitative, but the control units may be formed by combining a microcomputer and an electric circuit. Furthermore, although in the above-described embodiments, the lockup clutch 35 of a hydraulically driven friction type is used as a clutch for engagement and disengagement between the pump impeller 32 and the turbine runner 33, this is not limitative, but any suitable clutch, such as an electromagnetic clutch, may be used insofar as it is capable of controlling the degree of engagement between the pump impeller 32 and the turbine runner 33. Further, although in the above-described embodiments, the present invention is applied to a vehicle, this is not limitative, but for example, it can be applied to a boat, and so forth.

It is further understood by those skilled in the art that the foregoing are preferred embodiments of the invention, and that various changes and modifications may be made without departing from the spirit and scope thereof.

What is claimed is:

1. A power unit for driving a driven member, comprising:
a prime mover;
a fluid coupling that includes an input member and an output member, said fluid coupling being configured to be capable of transmitting power between said input member and said output member via working fluid;
a first power transmission mechanism that includes first, second and third elements, and has a function of distributing power input to said second element to said first element and said third element, and a function of combining power input to said first element and power input to said third element, and then outputting combined power to said second element, said first to third elements being configured such that respective rotational speeds of said first to third elements satisfy a collinear relationship and are aligned in order in a collinear chart representing the collinear relationship, said first element being mechanically connected to said driven member, said second element being mechanically connected to said prime mover, and said third element being mechanically connected to said input member;

a second power transmission mechanism that includes fourth, fifth and sixth elements, and has a function of distributing power input to said fifth element to said fourth element and said sixth element, and a function of combining power input to said fourth element and power input to said sixth element and then outputting combined power to said fifth element, said fourth to sixth elements being configured such that respective rotational speeds of said fourth to sixth elements satisfy a collinear relationship and are aligned in order in a collinear chart representing the collinear relationship, said fourth element being mechanically connected to said prime mover, said fifth element being mechanically connected to said driven member, and said sixth element being mechanically connected to said output member;

a rotating machine mechanically connected to one of said third element and said sixth element;

a control unit for controlling an operation of said rotating machine; and an electric power storage device electrically connected to said rotating machine.

2. A power unit as claimed in claim 1, wherein said first power transmission mechanism is a first planetary gear unit that has a first sun gear, a first ring gear, and a first carrier rotatably supporting first planetary gears in mesh with said first sun gear and said first ring gear, said first element being one of said first sun gear and said first ring gear, said second element being said first carrier, and said third element being the other of said first sun gear and said first ring gear, and wherein said second power transmission mechanism is a second planetary gear unit that has a second sun gear, a second ring gear, and a second carrier rotatably supporting second planetary gears in mesh with said second sun gear and said second ring gear, said fourth element being one of said second sun gear and said second ring gear, said fifth element being said second carrier, and said sixth element being the other of said second sun gear and said second ring gear.

3. A power unit as claimed in claim 2, wherein said first element is said first sun gear, said third element being said first ring gear, said fourth element being said second sun gear, and said sixth element being said second ring gear.

4. A power unit as claimed in claim 1, further comprising a clutch that is configured such that a degree of engagement of said clutch is controllable, and is provided for engagement and disengagement between said input member and said output member.

* * * * *